US009787336B1

(12) United States Patent
Cova

(10) Patent No.: US 9,787,336 B1
(45) Date of Patent: Oct. 10, 2017

(54) DEVICE AND METHOD OF PRE-DISTORTION OF POWER AMPLIFIER INPUT SIGNALS

(71) Applicant: Intel IP Corporation, Santa Clara, CA (US)

(72) Inventor: Armando Cova, Chandler, AZ (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/280,392

(22) Filed: Sep. 29, 2016

(51) Int. Cl.
*H04L 25/49* (2006.01)
*H04B 1/04* (2006.01)

(52) U.S. Cl.
CPC ... *H04B 1/0475* (2013.01); *H04B 2001/0425* (2013.01)

(58) Field of Classification Search
CPC ... H03F 1/3247; H04F 1/3241; H04L 27/362; H04L 3/04883; H04L 27/265; H04B 1/0475
USPC .............. 375/297, 295; 455/114.3, 226.1
See application file for complete search history.

(56) References Cited

U.S. PATENT DOCUMENTS

| 2011/0096865 A1* | 4/2011 | Hori | H03F 1/3247 375/295 |
|---|---|---|---|
| 2014/0086361 A1* | 3/2014 | Azadet | H04L 1/0054 375/297 |
| 2015/0236730 A1* | 8/2015 | Zhao | H04B 1/0475 375/296 |
| 2016/0087657 A1* | 3/2016 | Yu | H04B 1/0475 375/297 |

* cited by examiner

*Primary Examiner* — Khai Tran
(74) *Attorney, Agent, or Firm* — Schwegman Lundberg & Woessner, P.A.

(57) ABSTRACT

Embodiments of a mobile communication device and method for digital pre-distortion (DPD) are disclosed herein. The mobile communication device may scale a sequence of input samples by per-sample scale factors to generate a sequence of output samples for input to a power amplifier (PA), the input samples scaled to compensate for distortion of the PA. The mobile communication device may generate the scale factors based on per-sample inner products between a common weight vector and a per-sample distortion compensation vectors. The mobile communication device may generate the distortion compensation vectors based on vector outputs of predetermined distortion compensation functions. The mobile communication device may update the common weight vector based on a distortion error sequence between the sequence of output samples and a sequence of feedback samples.

26 Claims, 10 Drawing Sheets

DEVICE AND METHOD OF PRE-DISTORTION OF POWER AMPLIFIER INPUT SIGNALS

TECHNICAL FIELD

Some embodiments pertain to pre-distortion of signals, including signals to be input to power amplifiers and/or other components. Some embodiments relate to in-phase/quadrature (IQ) distortion compensation. Some embodiments relate to memory distortion. Some embodiments relate to wireless devices. Some embodiments relate to mobile communication devices.

BACKGROUND

Communication devices may exchange various signals with other devices, such as data signals, control signals or other signals. As an example, a baseband signal may be up-converted to a radio frequency (RF) range for input to a power amplifier (PA). In some cases, one or more components of an input path may operate on the baseband signal before it is input to the PA. In some cases, the PA and/or component(s) of the input path may cause one or more types of distortion, including in-phase/quadrature (IQ) distortion, memory distortion and/or other types. Such distortion may potentially cause issues such as splatter into frequency bands adjacent to the RF channel, passband ripple and/or others, which may degrade performance of the devices. Accordingly, there is a need for devices and components to reduce and/or control such distortion in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
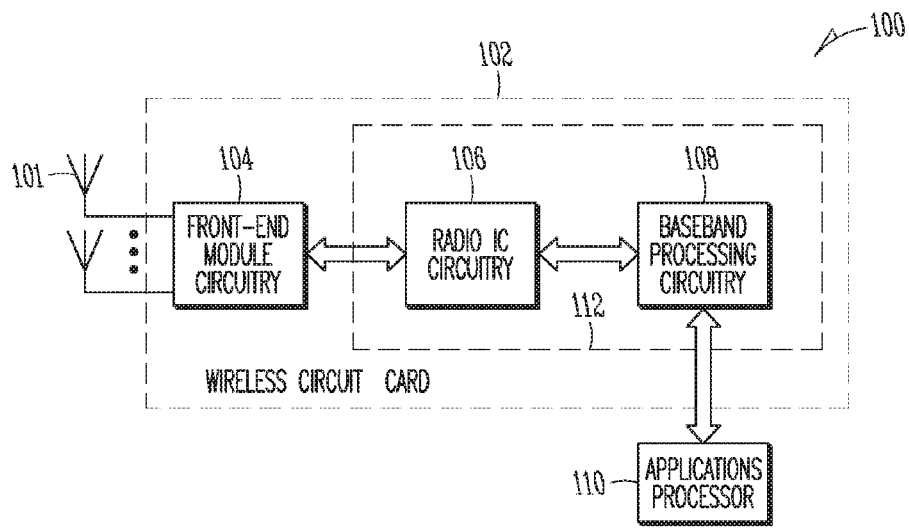
FIG. 1 is a block diagram of a radio architecture in accordance with some embodiments.

FIG. 1 is a block diagram of a radio architecture 100 in accordance with some embodiments. In some embodiments, some or all of the techniques or operations described herein may be applicable to the radio architecture 100 or other radio architectures. Some or all of the techniques described herein may be applicable to communication devices or other devices that may include a radio architecture such as 100 or other. However, the scope of embodiments is not limited in this respect, as some or all of the techniques or operations described herein may be applicable to other devices or architectures, in some embodiments. In some embodiments, some or all of the techniques or operations described herein may be applicable to devices or architectures that may not necessarily be related to a radio architecture or communication device.

Referring to FIG. 1, the radio architecture 100 may include front-end module circuitry 104, radio IC circuitry 106 and baseband processing circuitry 108. Front-end module circuitry 104 may include a receive signal path which may include circuitry configured to operate on RF signals received from one or more antennas 101, amplify the received signals and provide the amplified versions of the received signals to the radio IC circuitry 106 for further processing. Front-end module circuitry 104 may also include a transmit signal path which may include circuitry configured to amplify signals for transmission provided by the radio IC circuitry 106 for transmission by one or more of the antennas 101.

Radio IC circuitry 106 may include a receive signal path which may include circuitry to down-convert RF signals received from the front-end module circuitry 104 and provide baseband signals to the baseband processing circuitry 108. Radio IC circuitry 106 may also include a transmit signal path which may include circuitry to up-convert baseband signals provided by the baseband processing circuitry 108 and provide RF output signals to the front-end module circuitry 104 for subsequent transmission.

Baseband processing circuitry 108 may include one or more processors and control logic to process the baseband signals received from the receive signal path of the radio IC circuitry 106 and to generate the baseband signals for the transmit signal path of the radio IC circuitry 106. Baseband processing circuitry 108 may interface with applications processor 110 for generation and processing of the baseband signals and for controlling operations of the radio IC circuitry 106.

In some embodiments, the antennas 101, the front-end module circuitry 104, the radio IC circuitry 106, and baseband processing circuitry 108 may be provided on a single circuit card, such as wireless circuit card 102, although the scope of the embodiments is not limited in this respect. In some other embodiments, the antennas 101, the front-end module circuitry 104 and the radio IC circuitry 106 may be provided on a single circuit card. In some embodiments, the radio IC circuitry 106 and the baseband processing circuitry 108 may be provided on a single chip or integrated circuit (IC), such as IC 112, although the scope of the embodiments is not limited in this respect.

Figure 2:
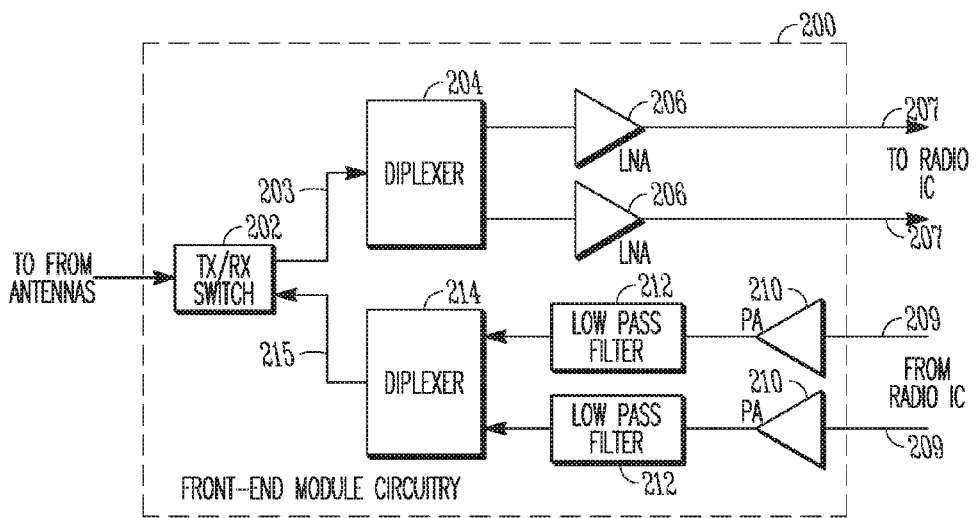
FIG. 2 illustrates example front-end module circuitry in accordance with some embodiments.

FIG. 2 illustrates front-end module circuitry 200 in accordance with some embodiments. The front-end module circuitry 200 is one example of circuitry that may be suitable for use as the front-end module circuitry 104 (FIG. 1), although other circuitry configurations may also be suitable. It should be noted that embodiments are not limited by the number, type or arrangement of components shown in the example front-end module circuitry 200 shown in FIG. 2. Some embodiments of front-end module circuitry may include additional components or alternate components, and some embodiments of front-end module circuitry may not necessarily include all components shown in the example front-end module circuitry 200 shown in FIG. 2.

In some embodiments, the front-end module circuitry 200 may include a TX/RX switch 202 to switch between transmit mode and receive mode operation. The front-end module circuitry 200 may include a receive signal path and a transmit signal path. The receive signal path of the front-end module circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the front-end module circuitry 200 may include a power amplifier (PA) 210 to amplify input RF signals 209 (e.g., provided by the radio IC circuitry 106), and one or more filters 212 to generate RF signals 215 for subsequent transmission (e.g., by one or more of the antennas 101 (FIG. 1)).

In some embodiments, the front-end module circuitry 200 may be configured to operate in multiple frequency bands. As a non-limiting example, either the 2.4 GHz frequency spectrum or the 5 GHz frequency spectrum may be used. As another example, more than two frequency bands may be used. In these embodiments, the receive signal path of the front-end module circuitry 200 may include a receive signal path diplexer 204 to separate the signals from each spectrum as well as a separate LNA 206 for each spectrum. In these embodiments, the transmit signal path of the front-end module circuitry 200 may also include a power amplifier 210 and a filter 212 for each frequency spectrum and a transmit signal path diplexer 214 to provide the signals of one of the different spectrums onto a single transmit path for subsequent transmission by the one or more of the antennas 101 (FIG. 1). These embodiments are not limiting, however, as the front-end module circuitry 200 may be configured to operate in one frequency band, in some cases.

Figure 3:
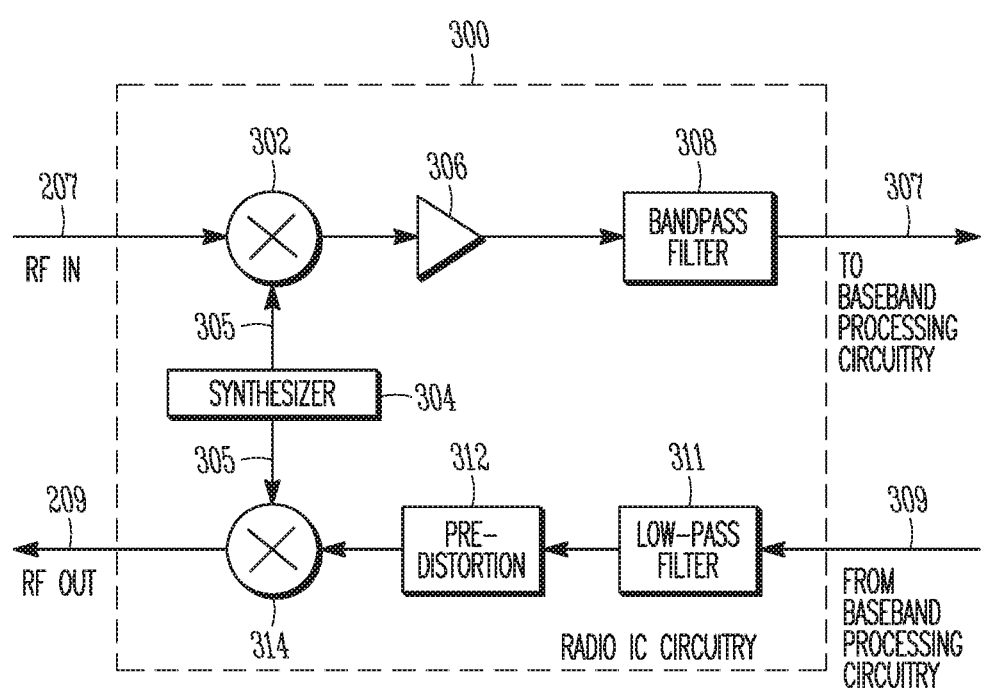
FIG. 3 illustrates example radio IC circuitry in accordance with some embodiments.

FIG. 3 illustrates radio IC circuitry 300 in accordance with some embodiments. The radio IC circuitry 300 is one example of circuitry that may be suitable for use as the radio IC circuitry 106 (FIG. 1), although other circuitry configurations may also be suitable. It should be noted that embodiments are not limited by the number, type or arrangement of components shown in the example radio IC circuitry 300 shown in FIG. 3. Some embodiments of radio IC circuitry may include additional components or alternate components, and some embodiments of radio IC circuitry may not necessarily include all components shown in the example radio IC circuitry 300 shown in FIG. 3.

In some embodiments, the radio IC circuitry 300 may include a receive signal path and a transmit signal path. The receive signal path of the radio IC circuitry 300 may include at least mixer circuitry 302, amplifier circuitry 306 and filter circuitry 308. The transmit signal path of the radio IC circuitry 300 may include at least filter circuitry 311 and mixer circuitry 314. In some embodiments, the transmit signal path may also include pre-distortion circuitry 312. Examples of pre-distortion circuitry that may be used will be described herein, although it is understood that embodiments are not limited by those examples. Radio IC circuitry 300 may also include synthesizer circuitry 304 for synthesizing a frequency 305 for use by the mixer circuitry 302 and/or the mixer circuitry 314.

In some embodiments, mixer circuitry 302 may be configured to down-convert RF signals 207 received from the front-end module circuitry 104 (FIG. 1) based on the synthesized frequency 305 provided by synthesizer circuitry 304. The amplifier circuitry 306 may be configured to amplify the down-converted signals and the filter circuitry 308 may be a band-pass filter (BPF) configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 309 based the synthesized frequency 305 provided by the synthesizer circuitry 304 to generate RF output signals 209 for the front-end module circuitry 104. The baseband signals 309 may be provided by the baseband processing circuitry 108 and may be processed by one or more of the filter circuitry 311 and/or pre-distortion circuitry 312. The filter circuitry 311 may include a low-pass filter (LPF), although the scope of the embodiments is not limited in this respect.

In some embodiments, the output baseband signals 307 and the input baseband signals 309 may be analog baseband signals, although the scope of the embodiments is not limited in this respect. In some alternate embodiments, the output baseband signals 307 and the input baseband signals 309 may be digital baseband signals. In these alternate embodiments, the radio IC circuitry may include analog-to-digital converter (ADC) and digital-to-analog converter (DAC) circuitry. In some dual-mode embodiments, a separate radio IC circuitry may be provided for processing signals for each spectrum, although the scope of the embodiments is not limited in this respect.

Figure 4:
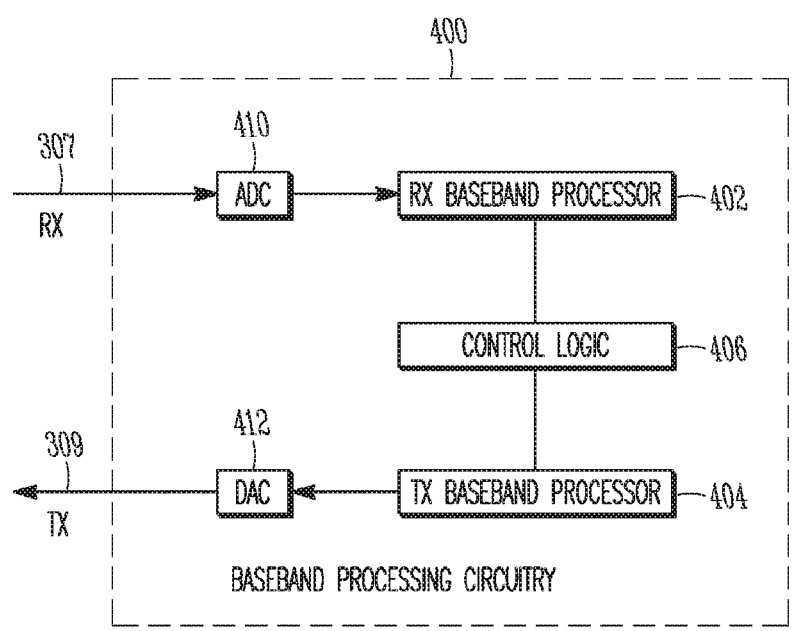
FIG. 4 illustrates example baseband processing circuitry in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. It should be noted that embodiments are not limited by the number, type or arrangement of components shown in the example baseband processing circuitry 400 shown in FIG. 4. Some embodiments of baseband processing circuitry may include additional components or alternate components, and some embodiments of baseband processing circuitry may not necessarily include all components shown in the example baseband processing 400 shown in FIG. 4.

The baseband processing circuitry 400 may include a receive baseband processor (RX BBP) 402 for processing receive baseband signals 307 provided by the radio IC circuitry 106 (FIG. 1) and a transmit baseband processor (TX BBP) 404 for generating transmit baseband signals 309 for the radio IC circuitry 106. The baseband processing circuitry 400 may also include control logic 406 for coordinating the operations with the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 504 to analog baseband signals.

Referring to FIG. 1, in some embodiments, the antennas 101 (FIG. 1) may comprise one or more directional or omnidirectional antennas, including, for example, dipole antennas, monopole antennas, patch antennas, loop antennas, micro-strip antennas or other types of antennas suitable for transmission of RF signals. In some multiple-input multiple-output (MIMO) embodiments, the antennas may be effectively separated to take advantage of spatial diversity and the different channel characteristics that may result.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, the radio architecture 100 may be part of a communication device such as a wireless local area network (WLAN) communication station (STA), a wireless access point (AP), user equipment (UE), an Evolved Node-B (eNB), a base station or a mobile device including a Wireless Fidelity (Wi-Fi) device. In some of these embodiments, radio architecture 100 may be configured to transmit and receive signals in accordance with specific communication standards, such as the Institute of Electrical and Electronics Engineers (IEEE) standards including IEEE 802.11-2012, 802.11n-2009, 802.11ac, and/or 802.11ax standards and/or proposed specifications for WLANs. In some embodiments, radio architecture 100 may be configured to transmit and receive signals in accordance with Third Generation Partnership Project (3GPP) standards including Long Term Evolution (LTE) standards. The scope of the embodiments is not limited in this respect, however, as the radio architecture 100 may also be suitable to transmit and/or receive communications in accordance with other techniques and standards. In addition, the radio architecture 100 may be configured to transmit and receive signals in multiple frequency bands in some embodiments.

In some embodiments, the radio architecture 100 may be part of a communication device such as a personal digital assistant (PDA), a laptop or portable computer with wireless communication capability, a web tablet, a wireless telephone, a smart-phone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the communication device may include one or more of a keyboard, a display, a non-volatile memory port, multiple antennas, a graphics processor, an application processor, speakers, and other mobile device elements. The display may be an LCD screen including a touch screen In some embodiments, the communication device may be or may be configured to operate as a mobile device and/or a stationary non-mobile device. As an example, the communication device may be a UE, eNB, AP or an STA. In some embodiments, the communication device may also be, or may be part of, an apparatus for such a device. As an example, a UE, eNB, AP or STA may include the communication device in addition to other equipment, components or elements. It should also be noted that some embodiments may be related to other electrical devices, electrical circuits or other devices that may or may not be related to communication.

Figure 5:
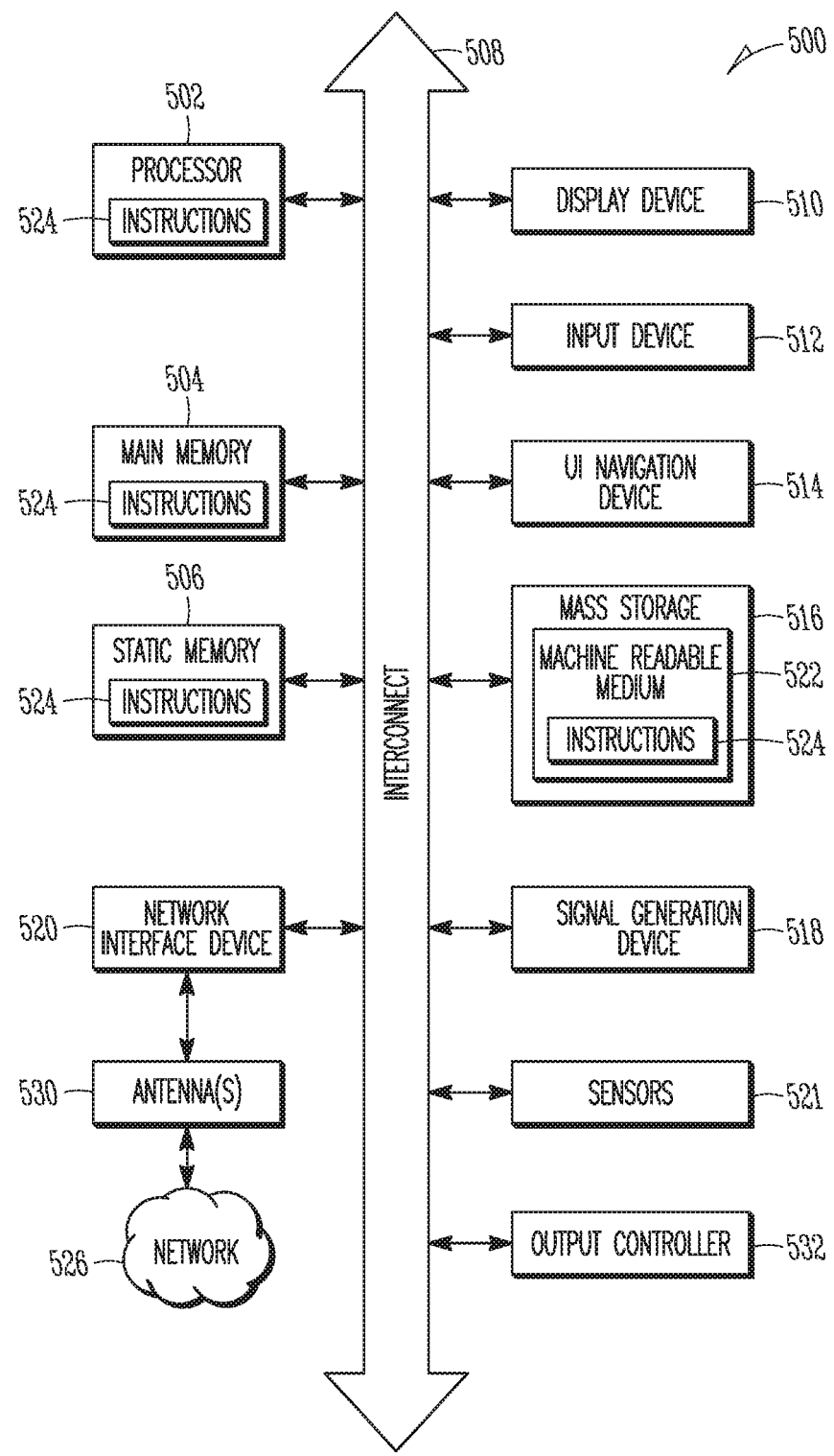
FIG. 5 illustrates an example machine in accordance with some embodiments.

FIG. 5 illustrates a block diagram of an example machine in accordance with some embodiments. The machine 500 is an example machine upon which any one or more of the techniques and/or methodologies discussed herein may be performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be an access point (AP), station (STA), User Equipment (UE), Evolved Node-B (eNB), wireless device, mobile communication device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB)), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media. In some embodiments, the machine readable medium may be or may include a non-transitory computer-readable storage medium. In some embodiments, the machine readable medium may be or may include a computer-readable storage medium.

While the machine readable medium 522 is illustrated as a single medium, the term "machine readable medium" may include a single medium or multiple media (e.g., a centralized or distributed database, and/or associated caches and servers) configured to store the one or more instructions 524. The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques. The term "transmission medium" shall be taken to include any intangible medium that is capable of storing, encoding or carrying instructions for execution by the machine 500, and includes digital or analog communications signals or other intangible medium to facilitate communication of such software.

In accordance with some embodiments, a mobile communication device 100 may scale a sequence of input samples by a group of per-sample scale factors to generate a sequence of output samples for input to a power amplifier (PA), the input samples scaled to compensate for distortion of the PA. The mobile communication device 100 may generate the scale factors based on per-sample inner products between a common weight vector and a group of per-sample distortion compensation vectors. The mobile communication device 100 may generate the distortion compensation vectors based on vector outputs of a predetermined group of distortion compensation functions. The mobile communication device 100 may update the common weight vector based on a distortion error sequence between the sequence of output samples and a sequence of feedback samples. In some embodiments, such operations may be performed by processing circuitry of the mobile communication device 100. These embodiments will be described in more detail below.

Figure 6:
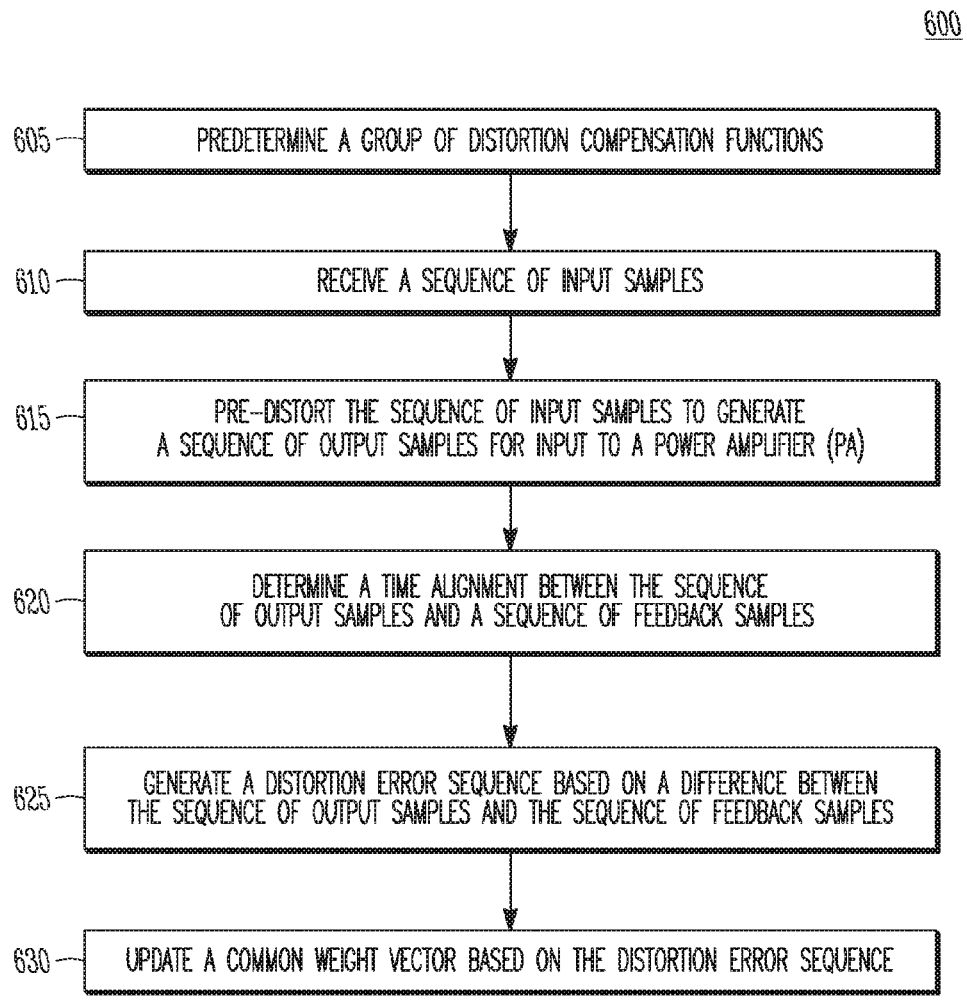
FIG. 6 illustrates the operation of an example method in accordance with some embodiments.

FIG. 6 illustrates the operation of an example method in accordance with some embodiments. It is important to note that embodiments of the method 600 may include additional or even fewer operations or processes in comparison to what is illustrated in FIG. 6. In addition, embodiments of the method 600 are not necessarily limited to the chronological order that is shown in FIG. 6. In describing the method 600, reference may be made to FIGS. 1-5 and 7-13, although it is understood that the method 600 may be practiced with any other suitable systems, interfaces and components. For instance, reference may be made to the example architecture 700 and/or example diagram 800 of DPD operations shown in FIGS. 7 and 8 as part of descriptions of the techniques, operations and/or implementations of the method 600, although such references are not limiting.

Figure 7:
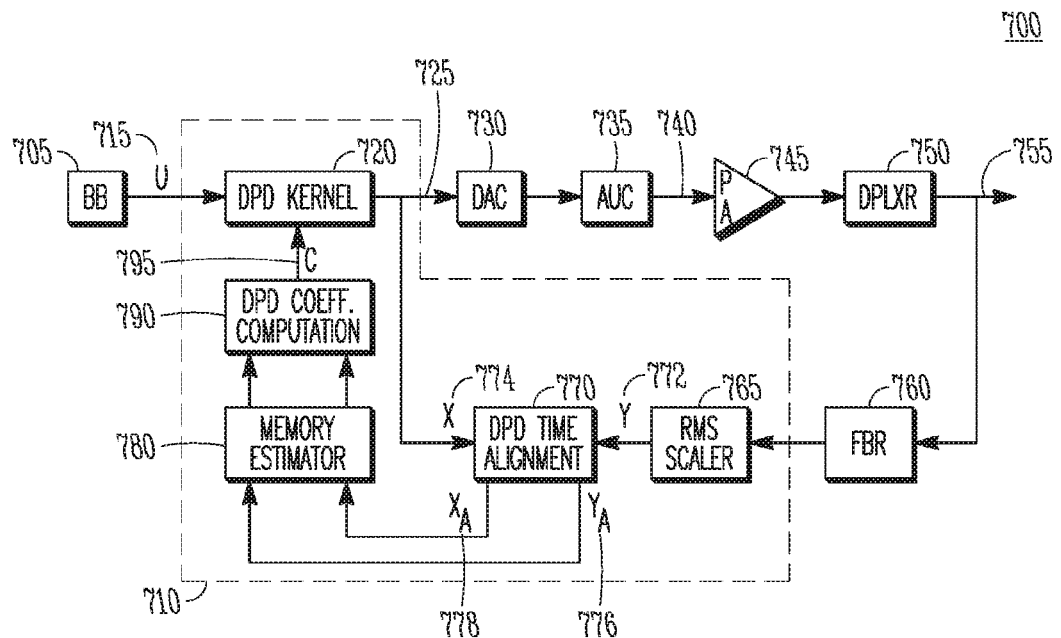
FIG. 7 illustrates an example architecture in accordance with some embodiments.
Figure 8:
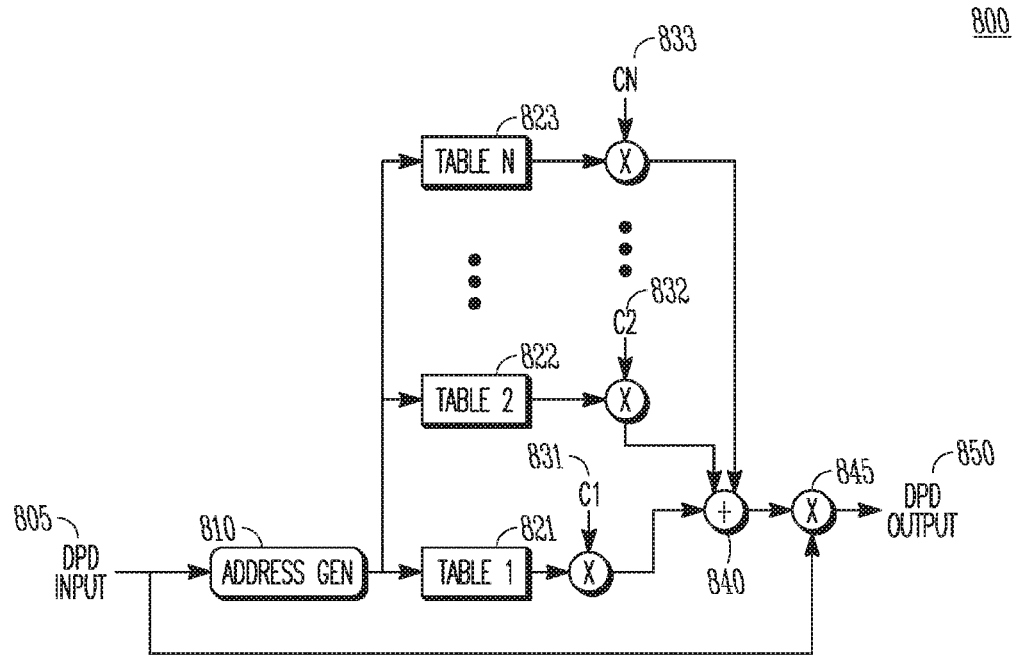
FIG. 8 illustrates an example diagram of digital pre-distortion (DPD) operations in accordance with some embodiments.

FIG. 7 illustrates an example architecture in accordance with some embodiments. FIG. 8 illustrates an example diagram of digital pre-distortion (DPD) operations in accordance with some embodiments. In some embodiments, the example architecture 700 may be included in a device, such as those described herein and/or other devices. In some embodiments, operations illustrated by the example diagram 800 may be performed by the device. It should be noted that embodiments are not limited by the number, type or arrangement of components and/or operations shown in the example architecture 700 and/or example diagram 800. Some embodiments may include additional components, alternate components, additional operations and/or alternate operations. Some embodiments may not necessarily include all components shown in the example architecture 700. Some embodiments may not necessarily include all operations shown in the example diagram 800.

In some embodiments, the example architecture 700 may include a baseband signal generator 705, DPD circuitry 710 (which may be included in processing circuitry configured to perform other operations that may or may not necessarily be related to DPD operations), a digital-to-analog converter (DAC) 730, an up-converter 735, PA 745, diplexer 750 and/or feedback module 760. One or more of the components of the example architecture 700 may be similar to or the same as one or more of the components shown in FIGS. 1-5, in some cases. Accordingly, in some embodiments, one or more components of any of FIGS. 1-5 and/or FIG. 7 may be used in various arrangements.

It should be noted that operations described herein (including but not limited to operations of methods 600, 900, 1100 and/or other methods and operations illustrated by any of FIGS. 1-13) may be performed using any suitable techniques and/or components. Accordingly, references to performance of such operations by DPD circuitry are not limiting. For instance, one or more processing components (such as the processor 502, the machine readable medium 522, the TX baseband processor 404 and/or other component) may perform one or more such operations, in some embodiments. In addition, one or more components of such DPD circuitry may be included in the processing component(s) in some embodiments. Such processing circuitry may be configured to perform other operations not necessarily related to DPD operations, in some cases. The one or more processing components may be operatively coupled to a storage element (such as one or more of main memory 504, static memory 506, mass storage 516, machine readable medium 522, instructions 524 and/or other component(s)) to perform one or more of the operations described herein (including but not limited to operations of methods 600, 900, 1100 and/or other methods and operations illustrated by any of FIGS. 1-13).

Figure 10:
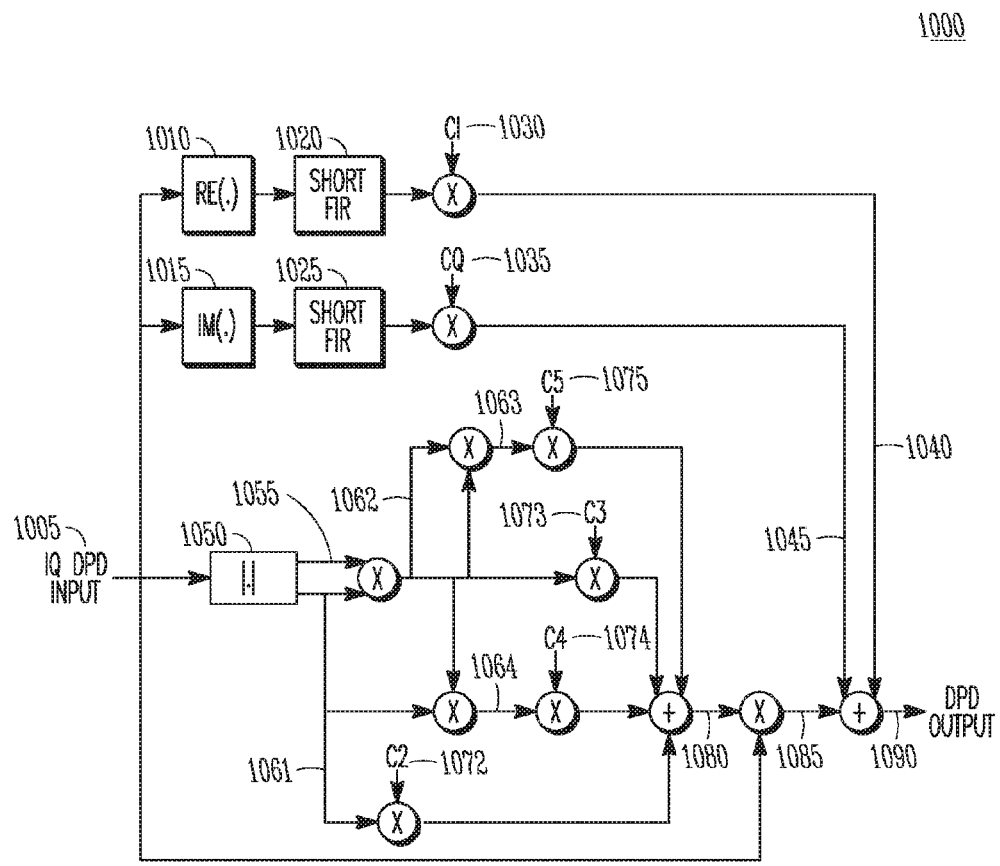
FIG. 10 illustrates an additional example diagram of DPD operations in accordance with some embodiments.
Figure 12:
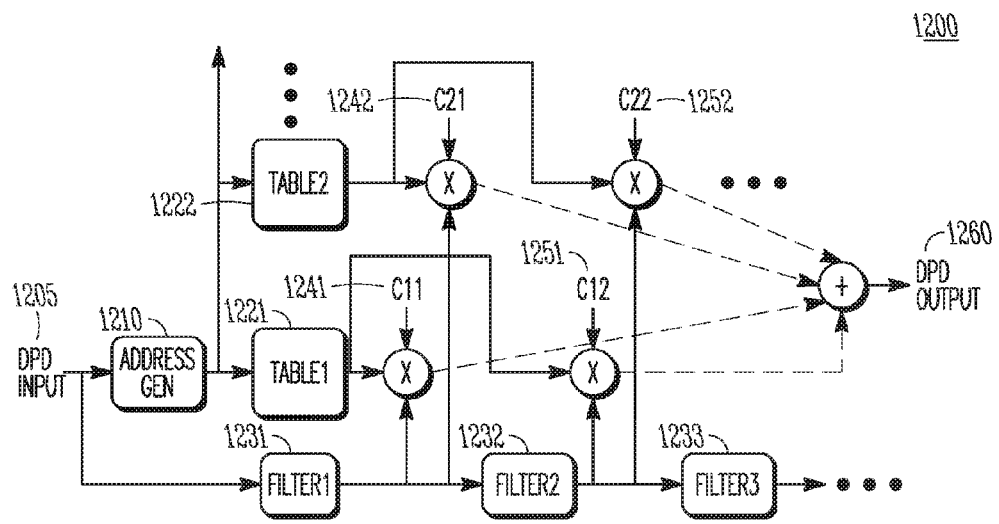
FIG. 12 illustrates an additional example diagram of DPD operations in accordance with some embodiments.

In addition, some embodiments described herein may use the example architecture 700 in which one or more operations performed by the DPD circuitry 710 may be illustrated in one or more of FIGS. 8, 10, 12 and/or 13. For instance, in the method 600, one or more operations shown in the example diagram 800 may be performed by the DPD kernel block 720 of the DPD circuitry 710. In some embodiments, the DPD circuitry 710 may be configured to perform one or more operations illustrated by components of FIGS. 8, 10, 12 and/or 13.

In addition, in some embodiments, in an operation of a method (such as 600, 900, 1100 and/or other), an output of a first operation may be used as an input to a second operation. In some cases, the output of the first operation may be used as a direct input to the second operation. In some cases, however, the output of the first operation may not necessarily be used as a direct input to the second operation. For instance, one or more other operations may be performed on the output of the first operation before it is used as an input to the second operation, in some cases. Accordingly, the output from the first operation may be affected, in some cases, by other operations before it is used as an input for the second operation. In such cases, the second operation may use the output from the first operation indirectly. As an example, a filtering operation may be performed on the output of the first operation, and the filtered output may be used as an input to the second operation.

At operation 605, a group of distortion compensation functions may be predetermined. In some embodiments, the group of distortion compensation functions may be predetermined based on a distortion of a power amplifier (PA). In some cases, the distortion may be an expected distortion of the PA based on one or more factors such as simulated behavior, analysis and/or other factor. The distortion compensation functions may be determined for usage by the DPD circuitry 710, in some cases, as will be described below. In some embodiments, the distortion compensation functions may be or may be based on one or more tables (such as a group of predetermined distortion compensation tables), in which case determination of function outputs may include output of one or more table entries.

Any suitable technique may be used to determine the distortion compensation functions, including but not limited to predetermination by the DPD circuitry 710, computer simulation, laboratory measurements/simulation, analysis and/or any combination thereof. In some embodiments, the functions may be predetermined as part of an initialization of the DPD circuitry 710. The scope of embodiments is not limited in this respect, however, as the functions may be determined/updated during operation of the device, in some embodiments.

In some embodiments, the distortion compensation functions may be predetermined, determined and/or updated in accordance with an orthogonality criterion between the functions. For instance, orthogonality in a predetermined input range may be used. As will be described below, such orthogonality may enable a reduction in complexity of some operations, such as matrix inversion and/or others. As a non-limiting example, Zernike functions may be used.

As an example, the group of distortion compensation functions may be determined through computer simulation techniques and stored in memory for usage by the DPD circuitry 710. As another example, the distortion compensation functions may be predetermined based on one or more factors such as an expected antenna loading of a device that comprises the DPD circuitry 710, an expected operating temperature of the device and/or other factor. In some cases, the group of distortion compensation functions may be selected, based on such factor(s), from a candidate group of distortion compensation functions.

As another example, for a candidate group of distortion compensation functions, a group of cross-correlation metrics (and/or other metrics) may be determined, by the DPD circuitry 710, based at least partly on one or more feedback sequences from the PA 745 when one or more test sequences of output samples are used as input to the PA 745. For instance, a test sequence/waveform generated by the DPD circuitry 710 and/or stored in memory may be input to the PA 745 to determine metric(s) and/or response(s), and the group of distortion compensation functions may be selected from the candidate group accordingly. Example test sequences/waveforms may include or may be based on random data, random noise, patterns, templates, pre-stored sequences/waveforms and/or other sequences/waveforms. For instance, the group of distortion compensation functions may be selected from the candidate group based at least partly on the determined cross-correlation metrics.

At operation 610 of the method 600, an input baseband signal may be received. As an example, a sequence of input samples 715 (labeled as "u") may be received at the DPD circuitry 710. In some embodiments, the input samples may be output from the baseband signal generator 705. Any suitable baseband signal/samples may be used. For instance, the input samples may be based on data bits, control bits and/or other bits that are encoded using one or more transmitter functions and/or encoding functions, in some cases. As another example, referring to FIG. 8, the input 805 may be used for one or more operations illustrated by the diagram 800. It should be noted that embodiments are not limited to discrete sequences in the input and/or output of the DPD circuitry 710, as continuous signals may be used in some embodiments.

At operation 615, the sequence of input samples may be pre-distorted to generate a sequence of output samples for input to the PA 745. The pre-distortion may be performed by the DPD circuitry 710 and/or by one or more components of the DPD circuitry 710, in some embodiments. For instance, the sequence of input samples 715 (labeled as "u") may be input to the DPD kernel block 720, which may perform one or more operations described herein, such as pre-distortion operations to generate the sequence of output samples 725. One or more suitable operations may be performed as part of the pre-distortion, including scaling, filtering and/or others.

In some embodiments, the sequence of input samples may be scaled by a group of per-sample scale factors to generate a sequence of output samples for input to the PA 745. The input samples may be scaled to compensate for a distortion of the PA 745 in some cases. The distortion may be an expected distortion of the PA 745, in some cases. It should be noted that, in operations described herein (including but not limited to operations of methods 600, 900, 1100 and/or other methods and operations illustrated by any of FIGS. 1-13), embodiments are not limited to compensation of various types of distortion. In some embodiments, distortion may be mitigated, reduced or canceled by such operations.

As a non-limiting example, for a particular sample of the sequence of input samples, a scale factor may be determined and may be used to scale the particular sample to generate a corresponding sample of the sequence of output samples. In some cases, for each sample in the sequence of input samples, a scale factor may be determined and each sample in the sequence of input samples may be scaled to generate a corresponding sample of the sequence of output samples. The scale factors may be based on per-sample inner products between a common weight vector and a group of per-sample distortion compensation vectors. The distortion compensation vectors may be based on vector outputs of a predetermined group of distortion compensation functions when the input samples are used as inputs.

In some embodiments, the distortion compensation functions may be based on distortion compensation tables, and the vector outputs may be based on a predetermined mapping between ranges (including but not limited to amplitude ranges) of values input to the distortion compensation tables and intra-table pointers to values within the distortion compensation tables. For a particular input sample, an intra-table pointer may be determined based on a predetermined mapping between amplitude ranges of the input signal and a candidate range of intra-table pointers. A distortion compensation vector for the input sample may be based on output values of the distortion compensation tables indexed within the distortion compensation tables by the determined intra-table pointer. A corresponding sample of the output signal may be based on a product of the input signal sample and an inner product between the distortion compensation vector and the common weight vector. In some embodiments, the common weight vector may be used in the determination of all (or at least some) of the scale factors used for the sequence of input samples. That is, the scale factor for a particular input sample may be based on an inner product between the common weight vector and a sample-dependent vector (the distortion compensation vector) for the particular input sample.

Referring to the example diagram 800 shown in FIG. 8, the distortion compensation functions may be based on a group of predetermined distortion compensation tables 821, 822, 823. It should be noted that N tables and N elements $c_1$, $c_2$, ... $c_N$ are used in this example, but any suitable number (such as one, two, three and/or other) may be used. For a particular sample of the input 805, an address generation block 810 may be used to generate an intra-table pointer. The intra-table pointer may be used to address values stored within the tables 821, 822, 823 in this example. For instance, the tables 821, 822, 823 may each include P values, and the intra-table pointer may indicate a number on 1, 2, ... P. For a particular value of the intra-table pointer, a distortion compensation vector may be formed by reading corresponding values from the tables 821, 822, 823. For instance, when a value of two is determined for the intra-table pointer, the second value (from 1, 2, ... . P) of each table may be used to form the distortion compensation vector. The common weight vector may include $c_1$, $c_2$, ... $c_N$, as indicated by 831, 832, 833 in FIG. 8. An inner product between the values from the tables 821, 822, 823 and the common weight vector (indicated by 831, 832, 833) may be formed as indicated by the summation 840, and the resulting inner product may be used to scale the input 805 (as indicated by the multiplier 845) to generate the output 850. In some embodiments, the output 725 in FIG. 7 may be or may be based on the output 850.

It should be noted that the example diagrams shown in FIGS. 8, 10, 12 and/or 13 may represent operations that may be implemented using any suitable technique. For instance, the operations may be implemented by processing circuitry, including but not limited DPD circuitry such as 710 in FIG. 7. Accordingly, embodiments are not limited to the arrangement of operations shown in those figures. For instance, FIG. 8 illustrates a term-by-term multiplication between the values from the tables 821, 822, 823 and the common weight vector (indicated by 831, 832, 833) to determine an inner product. This implementation may be used in some cases, but embodiments are not limited as such. As an example, a single multiply/accumulate operation may be implemented in hardware, in which case the terms of the inner product may not necessarily be determined explicitly and/or individually. As another example, the determination of an output sample is not limited to explicit determination of a scale factor based on an inner product followed by multiplication by a corresponding input sample.

In some embodiments, operations described above regarding FIG. 8 may be further described using the equation below, although the scope of embodiments is not limited in this respect. An output sample at time kT, in which k is a discrete time index and T is a sampling period may be described as follows:

$$DPD_{out}(kT) = \sum_{n=1}^{N} c_n \eta_n(f(DPD_{in}(kT)))DPD_{in}(kT)$$

The $c_n$ may be the common weight vector, the $\eta_n$ functions may represent the distortion compensation tables, and the function $f(\ )$ may represent a mapping between ranges of input values and indexes to the distortion compensation tables. As a non-limiting example, the function $f(\ )$ may have a linear or approximately linear portion in a low amplitude to medium amplitude range and may saturate at high amplitudes. In some cases, amplitudes of the input samples may be used as input to the function $f(\ )$ or the function $f(\ )$ may operate on amplitudes of the input samples.

At operation 620, a time alignment between the sequence of output samples and a sequence of feedback samples may be determined. In some embodiments, the sequences of input samples and output samples may be in a baseband frequency range, the sequence of output samples may be generated for up-conversion to a radio frequency (RF) range for input to the PA, and the sequence of feedback samples may be based on a down-conversion of a PA output signal in the RF range to the baseband frequency range. As a non-limiting example, the time alignment may be at least partly based on a cross-correlation between the sequence of output samples and the sequence of feedback samples. In some cases, fractional interpolation techniques may be used as part of generation of the feedback samples and/or the cross-correlation.

At operation 625, a distortion error sequence may be determined, in accordance with the time alignment, based on a difference between the sequence of output samples and the sequence of feedback samples. At operation 630, the common weight vector may be updated/adapted based at least partly on the distortion error sequence. Any suitable technique may be used, non-limiting examples of which will be described below.

For instance, referring to FIG. 7, the output sequence 725 may be converted to an analog signal and/or continuous signal by the DAC 730, the output of which may be up-converted to the RF range by the up-converter 735 to generate the RF signal 740 for input to the PA 745. The output of the diplexer 750 (or in some embodiments, the output of the PA 745) may be down-converted by the feedback receiver 760 (and in some embodiments scaled by the RMS scaler 765) to generate the signal 772 (labeled "y") at baseband, which may be input to the time alignment block 770. In addition, the output signal 725 (labeled "x") may be input to the time alignment block 770 as the signal 774. These inputs 772, 774 may be time aligned by time alignment block 770 to generate signals 776 and 778 (labeled as "ya" and "xa"). In some embodiments, a distortion error sequence may be determined based on a difference between signals 776 and 778.

In some embodiments, the distortion error sequence may be determined based on a difference between signal 778 (the sequence of output samples) and a processed version of signal 772. For instance, the signal 772 (output of the PA 745 down-converted to baseband) may be processed to generate the signal 776 for usage in the distortion error sequence. The processed signal 776 may be generated, in some cases, using the same or similar operations of the DPD kernel block 720 used to generate the output sequence 725 from the input sequence 715. It should be noted that the operations of the DPD kernel block 720 may be different in different embodiments described herein. Accordingly, the set of operations used to generate the processed signal 776 may be varied accordingly based on the set of operations used by the DPD kernel block 720 to generate the output sequence 725 from the input sequence 715.

As a non-limiting example in which operations shown in FIG. 8 are used by the DPD kernel 720, the DPD kernel 720 may scale the input sequence 715 by a first group of scale factors to generate the output sequence 725. The first group of scale factors may be based on inner products between the common weight vector and a first group of distortion compensation vectors (based on vector outputs of the distortion compensation functions when the samples of the input sequence 715 are used as input). In this example, similar operations may be performed on the sequence 772 to generate the sequence 776 for usage in the distortion error sequence. Accordingly, the processing circuitry may scale the sequence 772 by a second group of scale factors to generate the output sequence 776. The second group of scale factors may be based on inner products between the common weight vector and a second group of distortion compensation vectors (based on vector outputs of the distortion compensation functions when the samples of the sequence 772 are used as input).

Embodiments are not limited to the example described above in which the DPD kernel 720 performs operations shown in FIG. 8. The techniques described in the example may be extended and/or modified for other embodiments (including but not limited to those shown in FIGS. 10, 12, and 13) based on the set of operations performed by the DPD kernel 720.

In some embodiments, the distortion error sequence (and/or the signals 776 and 778 in some cases) may be input to the coefficient computation block 790. In some cases, the distortion error sequence (and/or the signals 776 and 778 in some cases) may be input to the optional memory estimation block 780 before input to the coefficient computation block 790, examples of which will be described below. The coefficient computation block 790 may determine an updated common weight vector 795 (labeled as "c"), which may be used by the DPD kernel block 720. For instance, the updated common weight vector may be used by the DPD kernel block 720 for pre-distortion of at least a subsequent sequence of samples, in some cases.

As an example, the common weight vector may be updated in accordance with a minimization of an expected mean-squared value of the distortion error sequence. For instance, the common weight vector may be updated in accordance with a correlation matrix for the feedback samples and/or distortion error sequence samples, in some cases. Accordingly, the distortion compensation functions may be predetermined in accordance with an orthogonality between the functions in a predetermined input range to enable a diagonalization of the correlation matrix. For instance, in a diagonal square matrix, diagonal entries may be non-zero while off-diagonal entries are zero. Off-diagonal entries may be related to cross-correlation terms between functions, which may be zero when orthogonal functions are used, in some cases. It should be noted that determination of an inverse of the correlation matrix may be less demanding for a diagonal correlation matrix than for a non-diagonal correlation matrix, in some cases. In a non-limiting example of orthogonal functions that may be used, one or more orthogonal Zernike functions may be used.

In some embodiments, the common weight vector may be adaptable, as will be described below. For instance, a first value of the common weight vector may be used to pre-distort a first sequence of input samples to generate a first sequence of output samples. An adaptation of the common weight vector may be performed based on the first sequence of output samples to generate a second (updated) value of the common weight vector. For instance, a sequence of post-distortion samples based on a distorted version of the first sequence, such as samples out of the PA that are fed back to the DPD circuitry, may be used to adapt the common weight vector, as will be described below. The second value of the common weight vector may be used for scaling of a second, subsequent sequence of input samples.

Non-limiting examples of formulas that may be used in accordance with some embodiments are presented below. In some embodiments, these formulas and/or similar formulas may be used as part of one or more operations described herein, but it is understood that embodiments are not limited to usage of these or other formulas. In these formulas, c is the common weight vector, B is a correlation matrix, a is a projection vector, xa and ya may be time aligned signals shown in FIG. 7, and the $\eta_n$ are the distortion compensation functions.

$$B = [\eta_1(y_a) \ldots \eta_n(y_a)]'[\eta_1(y_a) \ldots \eta_n(y_a)]$$

$$\overline{a} = [\eta_1(y_a) \ldots \eta_n(y_a)]'(x_a/y_a)$$

When the distortion compensation functions are orthogonal, the nth value of the common weight vector may be determined using the formula below, in some cases. The value M in the two formulas below may be a number of data samples over which the summations are collected.

$$c_n = \frac{\sum_1^M \eta_n(y_a(kT))'(x_a(kT)/y_a(kT))}{\sum_1^M \eta_n(y_a(kT))'\eta_n(y_a(kT))}$$

When the distortion compensation functions are orthonormal (orthogonal and normalized to unit energy per function), the nth value of the common weight vector may be determined using the formula below, in some cases.

$$c_n = \sum_1^M \eta_n(y_a(kT))' \frac{x_a(kT)}{y_a(kT)}$$

Figure 9:
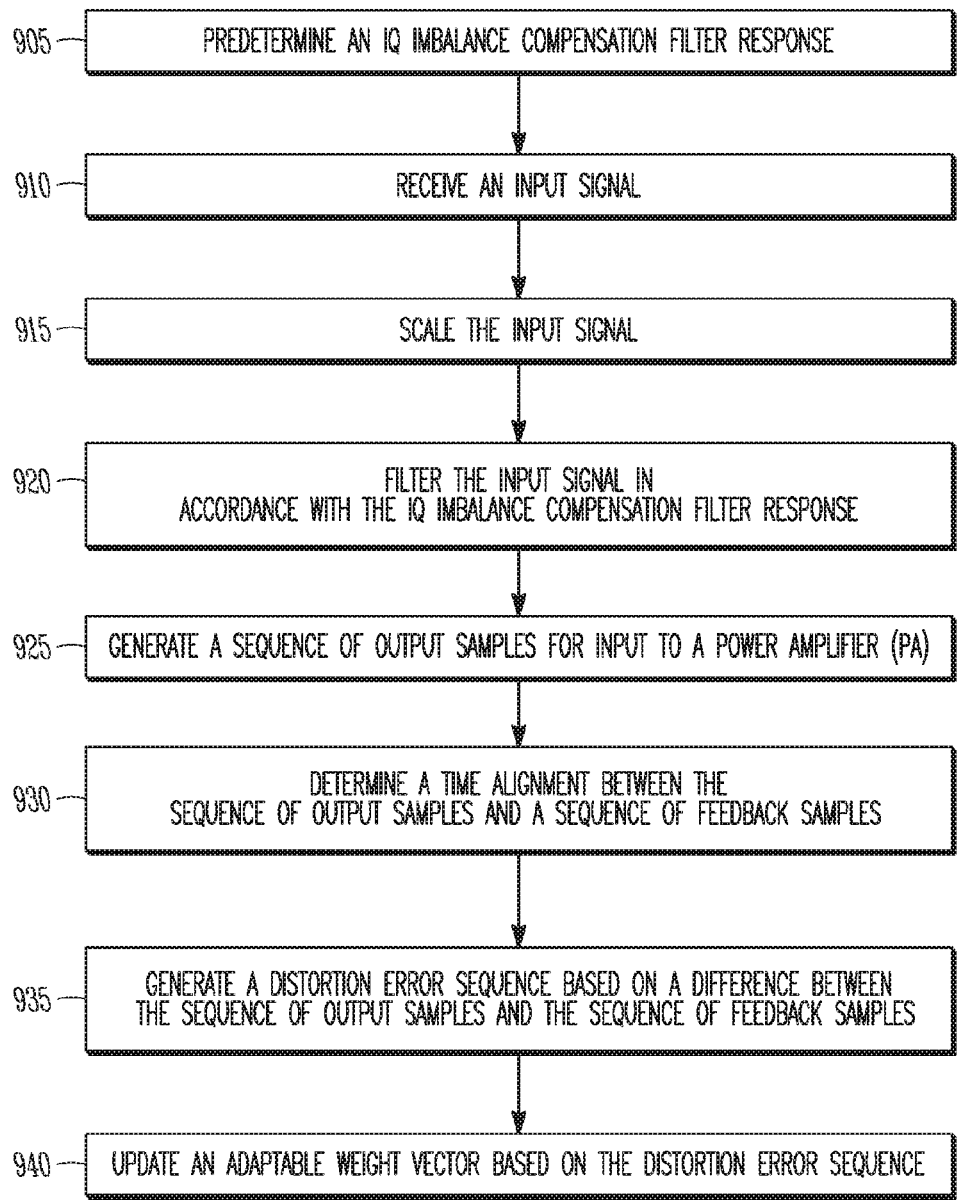
FIG. 9 illustrates the operation of another example method in accordance with some embodiments.
Figure 11:
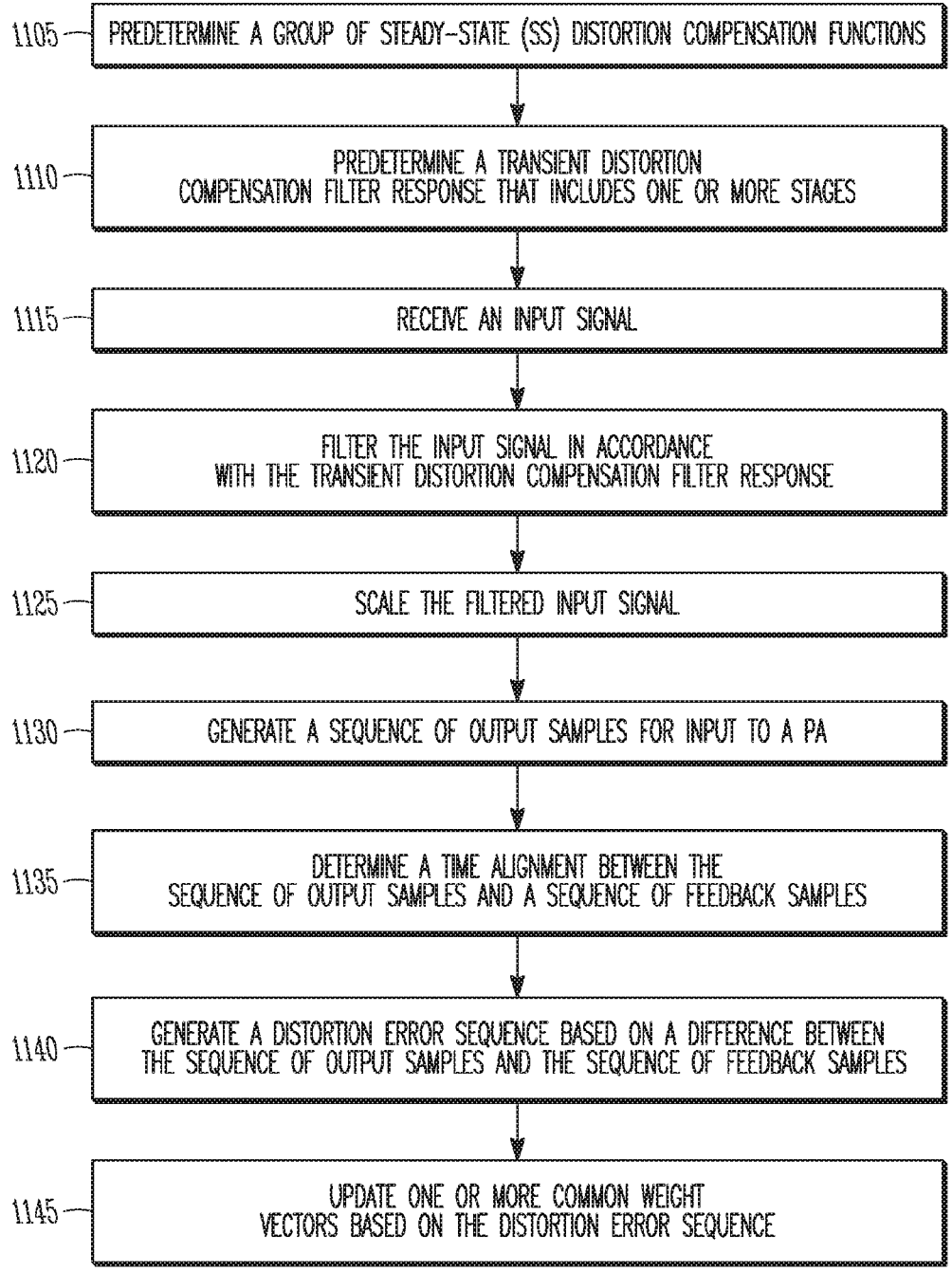
FIG. 11 illustrates the operation of another example method in accordance with some embodiments.
Figure 13:
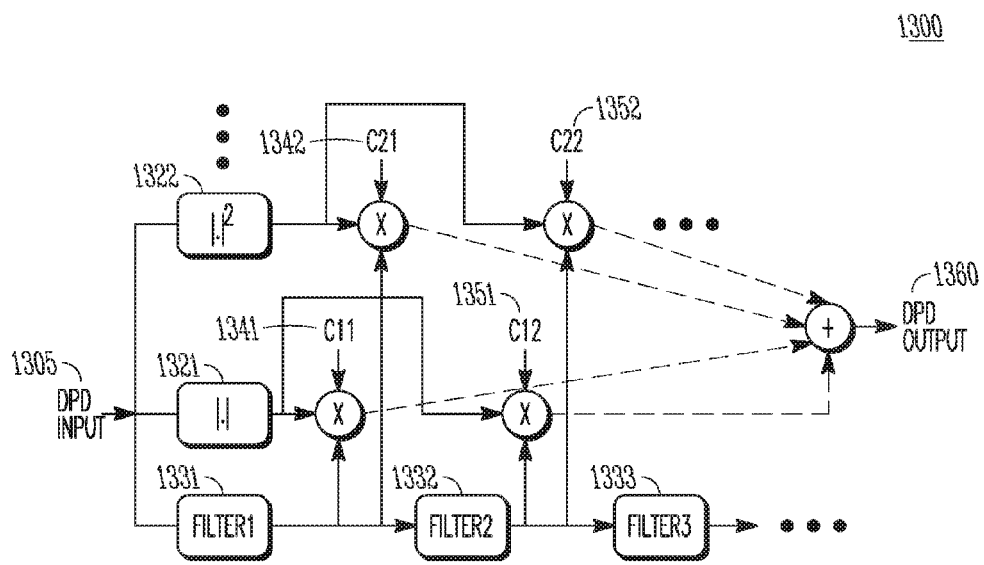
FIG. 13 illustrates an additional example diagram of DPD operations in accordance with some embodiments.

FIGS. 9 and 11 illustrate the operation of other example methods in accordance with some embodiments. FIGS. 10, 12, and 13 illustrate additional example diagrams of DPD operations in accordance with some embodiments. As mentioned previously regarding the method 600, embodiments of the method 900 and/or 1100 may include additional or even fewer operations or processes in comparison to what is illustrated in FIGS. 9 and 11 and embodiments are not necessarily limited to the chronological order that is shown in FIGS. 9 and 11. In describing the methods 900 and/or 1100, reference may be made to one or more of FIGS. 1-13, although it is understood that the methods 900 and/or 1100 may be practiced with any other suitable systems, interfaces and components. In addition, embodiments of the methods 900 and/or 1100 may be applicable to APs, STAs, UEs, eNBs or other wireless devices or mobile communication devices or mobile devices. The methods 900 and/or 1100 may also be applicable to an apparatus for one or more of the devices described above.

In addition, previous discussion of various techniques and concepts may be applicable to the methods 900 and/or 1100 in some cases, including digital pre-distortion (DPD), DPD circuitry, distortion compensation functions, distortion compensation tables, inputs to a PA, feedback from the PA, techniques for updating a common weights vector, orthogonal functions, Zernike functions, time alignment, distortion error sequence and/or others.

In some embodiments, one or more operations of methods 900 and/or 1100 may be similar to or the same as one or more operations of method 600. In some embodiments, one or more operations of the method 900 may be illustrated by the example diagram 1000 shown in FIG. 10, although the scope of embodiments is not limited in this respect. In some embodiments, one or more operations of the method 1100 may be illustrated by the example diagram 1200 shown in FIG. 12 and/or the example diagram 1300 shown in FIG. 13, although the scope of embodiments is not limited in this respect. In some embodiments, one or more operations of the methods 900 and/or 1100 may be illustrated by one or more of the example architecture 700 and/or the example diagrams 800, 1000, 1200 and/or 1300 shown in FIGS. 8, 10, 12, and 13.

At operation 905, an in-phase/quadrature (IQ) imbalance compensation filter may be predetermined. In some embodiments, the IQ imbalance compensation filter may be determined based at least partly on an expected IQ imbalance of a PA input path that includes the DPD circuitry 710. For instance, the PA input path may include components such as the DPD kernel 720, DAC 730, up-converter 735 and/or others that may process and/or affect the input baseband signal 715 before it is input to the PA 745. As an example, the expected IQ imbalance may be based on a difference between amplitudes and/or phases of real and imaginary parts of a composite impulse response of the PA input path. As another example, the up-converter 735 may include a complex mixer, which may include two mixers, one each for real and imaginary components. A difference between amplitudes and/or phases of the two mixers may contributed to an IQ imbalance. In some embodiments, the filter response may include coefficients for a digital filter (discrete time filter), although the scope of embodiments is not limited in this respect. An analog filter response and/or other filter techniques may be used, in some embodiments.

In some embodiments, the IQ imbalance compensation filter response may be predetermined. The filter response may be predetermined as part of an initialization, in some cases, although the scope of embodiments is not limited in this respect. As an example, a set of IQ imbalance metrics may be determined based at least partly on one or more feedback signals from the PA 745 when one or more test input signals are filtered in accordance with each of a candidate group of IQ imbalance compensation filter responses for input to the PA 745. The IQ imbalance compensation filter response (the one that is used to filter the input signal) may be selected from the candidate group based at least partly on the determined IQ imbalance metrics. This example is not limiting, however, as any suitable techniques may be used to predetermine the IQ imbalance compensation filter response, including but not limited to predetermination by the DPD circuitry 710, computer simulation, laboratory measurements/simulation, analysis and/or any combination thereof.

At operation 910, the input signal may be received. As a non-limiting example, the input signal may be received at the DPD circuitry 710. At operation 915, the input signal may be scaled. In some embodiments, the input signal may be scaled based on a summation of integer powers of an envelope of the input signal weighted by a common weight vector. The input signal may be scaled to compensate for a distortion of the PA 745, in some cases. In some embodiments, the distortion may be an expected distortion of the PA, although the scope of embodiments is not limited in this respect.

At operation 920, the input signal may be filtered in accordance with the IQ imbalance compensation filter response. In some embodiments, the input signal may be filtered to compensate for an IQ distortion, such as an IQ distortion of the PA input path. In some embodiments, the IQ distortion may be an expected IQ distortion determined by one or more techniques such as computer simulation, laboratory measurements/simulation, analysis and/or any combination thereof. Any suitable technique may be used for the filtering, including a complex filter response or a pair of filter responses (one for each of real and complex parts). In addition, finite impulse response (FIR), infinite impulse response (IIR) and/or other suitable filter responses may be used.

At operation 925, an output signal may be generated based on a summation of the filtered input signal and the scaled input signal. The output signal may be generated for input to the PA, in some embodiments. Examples of techniques and/or operations that may be used to generate the output signal will be described below. In some embodiments, the input signal may be or may include one or more sequences of input samples. In addition, the output signal may be or may include one or more sequences of output samples, in some embodiments. However, embodiments are not limited to sampled sequences for either the input signal or the output signal, as continuous time signals may be used in some embodiments.

At operation 930, a time alignment between the sequence of output samples and a sequence of feedback samples may be determined. At operation 935, a distortion error sequence based on a difference between the sequence of output samples and the sequence of feedback samples may be generated. In some embodiments, the input signal and the output signal may be in a baseband frequency range, the output signal may be generated for up-conversion to a radio frequency (RF) range for input to the PA, and the feedback signal may be based on a down-conversion of a PA output signal in the RF range to the baseband frequency range. At operation 940, the common weight vector used at operation 915 may be updated based on the distortion error sequence.

In some embodiments, techniques such as those described herein regarding FIG. 7 and/or similar techniques may be used for operations such as 930-940. The scope of embodiments is not limited in this respect, however, as other suitable techniques may be used.

Referring to FIG. 10, one or more operations illustrated by the example diagram 1000 may be used for generation of the output signal, such as in operation 925 and/or other operations. A number of elements 1072-1075 (labeled as c2, c3, c4, c5) may be multiplied by various powers (exponents) of the amplitude of the input signal 1005. For instance, the various powers may be generated by multiplication of the output 1055 of the amplitude block 1050 by itself and by subsequent multiplications of such outputs. In the example shown in FIG. 10, the signal 1080 may be (c2*mag+ c3*mag^+c4*mag^+c5*mag^4), in which "mag" is the amplitude 1055 of the input signal 1005. The signal 1080 may be used to scale the input signal 1005 to generate the signal 1085. The input signal 1005 may also be filtered by the filters 1020, 1025 of coefficients indicated by cI 1030 and cQ 1035. In some cases, a complex filter may be used. The outputs of the filtered signal 1040 and 1045 may be added to the signal 1085 to generate the output signal 1090. As described previously, embodiments are not limited by the arrangement and/or ordering of operations illustrated in FIG. 10.

In some embodiments, one or more operations of the method 900 may be described further described using the equation below, although the scope of embodiments is not limited in this respect. An output sample at time kT, in which k is a discrete time index and T is a sampling period may be described as follows:

$$DPD_{out}(kT) = \sum_{n=0}^{N} c_{In}\text{Re}(DPD_{in}(kT-n)) + \sum_{n=0}^{N} c_{Qn}\text{Im}(DPD_{in}(kT-n)) + \sum_{p=2}^{P} c_p |DPD_{in}(kT)|^{p-1} DPD_{in}(kT)$$

The $c_n$ may be a weight vector that may be used for a weighted summation of a set of integer powers (exponentials) of the magnitude of the input signal. In this case, the set of powers is between 2 and a number P, which may be any suitable number. The terms $c_{In}$ and $c_{Qn}$ may be coefficients of filters to filter the real and imaginary parts of the input signal.

In some embodiments, the weight vector may be adaptable. For instance, a first value of the common weight vector may be used to pre-distort a first sequence of input samples to generate a first sequence of output samples. An adaptation of the common weight vector may be performed based on the first sequence of output samples to generate a second (updated) value of the common weight vector. For instance, a sequence of post-distortion samples based on a distorted version of the first sequence, such as samples out of the PA that are fed back to the DPD circuitry, may be used to adapt the common weight vector, as will be described below. The second value of the common weight vector may be used for scaling of a second, subsequent sequence of input samples.

Non-limiting examples of formulas that may be used in accordance with some embodiments (including but not limited to those of method 600) are presented below. In some embodiments, these formulas and/or similar formulas may be used as part of one or more operations described herein, but it is understood that embodiments are not limited to usage of these or other formulas. In these formulas, c is the common weight vector, B is a correlation matrix, a is a projection vector, xa and ya are time aligned signals shown in FIG. 7, and the $\eta_n$ are the distortion compensation functions.

$$\vec{c} = B^{-1}\vec{a}$$

$$B = [\eta_1(y_a) \ldots \eta_n(y_a)]'[\eta_1(y_a) \ldots \eta_n(y_a)]$$

$$\bar{a} = [\eta_1(y_a) \ldots \eta_n(y_a)]' x_a$$

At operation 1105 of the method 1100, a group of steady-state distortion compensation functions may be predetermined. At operation 1110, a transient distortion compensation filter response may be predetermined. The steady-state distortion compensation functions may be predetermined to enable compensation for steady-state distortion of a PA. The transient distortion compensation filter response may be predetermined to enable compensation of a transient distortion of the PA. In some cases, the PA may be affected by both types of distortion, although the scope of embodiments is not limited in this respect.

In some embodiments, the steady-state distortion may be similar to the PA distortion described regarding the methods 600 and/or 900, although the scope of embodiments is not limited in this respect. In some cases, the steady-state distortion of a current output of the PA may be related to distortion caused to a current input by the PA. In some cases, the transient distortion of a current output of the PA may be related to distortion caused to a current input by previous inputs to the PA (such as inputs during a previous time period). In some cases, the transient distortion may be related to a memory characteristic of the PA, which may be due to transient behavior of one or more components of the PA. For instance, when a signal passes through a physical component, energy in the component due to the signal may dissipate after a particular time duration has elapsed.

In some embodiments, the group of steady-state distortion compensation functions may be determined based at least partly on a steady-state distortion of the PA. In some embodiments, the steady-state distortion may be an expected distortion that may be predetermined using one or more techniques, including but not limited to computer simulation, laboratory measurements/simulation, analysis and/or any combination thereof.

In some embodiments, the steady-state distortion compensation functions may be based on steady-state distortion compensation tables. Outputs of the steady-state distortion compensation functions may be determined based on techniques such as those described regarding the method 700. For instance, determination of an intra-table pointer based on an amplitude of a particular input sample may be used to determine a steady-state distortion compensation vector for that particular input sample. In some embodiments, a predetermined mapping between ranges of the input samples and intra-table pointers to values within the steady-state distortion compensation tables may be used to generate the output of the tables.

In some embodiments, a faster and/or less complex technique may include usage of different powers of input amplitude as the steady-state distortion compensation functions. For instance, powers in the range of 2, 3, . . . . M (for any suitable M) may be used. The steady-state distortion compensation vector for a particular input sample may be the amplitude raised to each power in the range of powers, in this case. It should be noted that embodiments are not limited to usage of consecutive integer powers and are also not limited to usage of integer powers.

In some embodiments, the transient distortion compensation filter response may be determined based at least partly on a transient distortion of the PA. In some embodiments, the transient distortion may be an expected distortion that may be predetermined using one or more techniques, including but not limited to computer simulation, laboratory measurements/simulation, analysis and/or any combination thereof. In some embodiments, a single filter response may be used. In some embodiments, the transient distortion compensation filter response may include multiple stages. As a non-limiting example, the multiple stages may be part of a cascade arrangement. Any suitable number of stages may be used in the cascade arrangement. Any suitable technique may be used for the filtering, including a complex filter response or a pair of filter responses (one for each of real and complex parts). In addition, FIR, IIR and/or other suitable filter responses may be used, in some cases.

In some embodiments, the transient distortion compensation filter response may be predetermined. The filter response may be predetermined as part of an initialization, in some cases, although the scope of embodiments is not limited in this respect. As an example, a set of transient distortion metrics may be determined based at least partly on one or more feedback signals from the PA 745 when one or more test input signals are filtered in accordance with each of a candidate group of transient distortion compensation filter responses for input to the PA 745. The transient distortion compensation filter response (the one that is used to filter the input signal) may be selected from the candidate group based at least partly on the determined transient distortion metrics. This example is not limiting, however, as any suitable techniques may be used to predetermine the transient distortion compensation filter response, including but not limited to predetermination by the DPD circuitry 710, computer simulation, laboratory measurements/simulation, analysis and/or any combination thereof.

At operation 1115, the input signal may be received. As a non-limiting example, the input signal may be received at the DPD circuitry 710. At operation 1120, the input signal may be filtered in accordance with the transient distortion compensation filter response. In some embodiments, multiple filter stages may be used, in which case multiple filtering operations may be performed in some cases. For instance, in a cascade arrangement, an output of a first stage may be used as input to a second stage that is next in the cascade. A filtered output signal (filtered in accordance with the transient distortion compensation filter response) may be an output of a final stage in the cascade, in some cases.

At operation 1125, the filtered signal may be scaled. In some embodiments, the filtered signal may be scaled based on a summation of integer powers of an envelope of the input signal weighted by a common weight vector. The input signal may be scaled to compensate for a steady-state distortion of the PA 745, in some cases. In some embodiments, the distortion may be an expected steady-state distortion of the PA, although the scope of embodiments is not limited in this respect.

In some embodiments, the filtered sequence of input samples may be scaled by a group of per-sample scale factors to generate a sequence of output samples for input to the PA. The filtered sequence may be scaled to compensate for a steady-state distortion of the PA. The scale factors may be based on a group of per-sample inner products between a common weight vector and a group of per-sample steady-state distortion compensation vectors. The steady-state distortion compensation vectors may be based on outputs of a group of predetermined steady-state distortion compensation functions. The steady-state distortion compensation functions may be based on a steady-state distortion of the PA.

At operation 1130, an output signal may be generated based on a summation of the filtered input signal and the scaled input signal. The output signal may be generated for input to the PA, in some embodiments. Examples of techniques and/or operations that may be used to generate the output signal will be described below. In some embodiments, the input signal may be or may include one or more sequences of input samples. In addition, the output signal may be or may include one or more sequences of output samples, in some embodiments. However, embodiments are not limited to sampled sequences for either the input signal or the output signal, as continuous time signals may be used in some embodiments.

At operation 1135, a time alignment between the sequence of output samples and a sequence of feedback samples may be determined. At operation 1140, a distortion error sequence based on a difference between the sequence of output samples and the sequence of feedback samples may be generated. In some embodiments, the input signal and the output signal may be in a baseband frequency range, the output signal may be generated for up-conversion to a radio frequency (RF) range for input to the PA, and the feedback signal may be based on a down-conversion of a PA output signal in the RF range to the baseband frequency range. At operation 1145, one or more common weight vectors (such as common weight vector(s) used at operation 1125) may be updated based on the distortion error sequence.

In some embodiments, techniques such as those described herein regarding FIG. 7 and/or similar techniques may be used for operations such as 1135-1145. The scope of embodiments is not limited in this respect, however, as other suitable techniques may be used.

In a non-limiting example, a transient distortion compensation filter response may include a cascade of a first stage followed by a second stage. A first common weight vector and a second common weight vector may be used. A first sequence of filter output samples of the first stage may be scaled by a first group of per-sample scale factors that are based on a first group of per-sample inner products between the first common weight vector and the group of per-sample steady-state distortion compensation vectors. A second sequence of filter output samples of the second stage may be scaled by a second group of per-sample scale factors that are based on a second group of per-sample inner products between a second common weight vector and the group of per-sample steady-state distortion compensation vectors. The sequence of output samples may be generated for input to the PA based on a summation of the scaled first sequence of filter output samples and the scaled second sequence of filter output samples. The first and second common weight vectors may be updated based on a distortion error sequence between the sequence of output samples and a sequence of feedback samples.

In some embodiments, the distortion compensation filter response may include a cascade of any suitable number of stages, such as two or more. In such embodiments, for each stage of the filter response, an output sequence of the stage may be scaled by a per-sample group of scale factors based on per-sample inner products between a common weight vector of the stage and a group of per-sample steady-state distortion compensation vectors. Accordingly, multiple common weight vectors (one per stage) may be used, and the common weight vectors may be updated based on a distortion error sequence between the sequence of output samples and a sequence of feedback samples.

Referring to FIG. 12, one or more operations illustrated by the example diagram 1200 may be used for generation of the output signal, such as in operation 1130 and/or other operations. It should be noted that two tables are shown and common vectors of length two are shown in FIG. 12 for ease of illustration, but embodiments are not limited to the usage of two tables or to common weight vectors of length two. Any suitable number may be used.

The input signal 1205 may be filtered by a first stage 1231, and the output may be scaled by an inner product of outputs of tables 1221, 1222 and a first common vector 1241, 1242 (labeled as c11 and c21). The output of the first stage 1231 may be filtered by a second stage 1232, and the output of the second stage 1232 may be scaled by an inner product of outputs of tables 1221, 1222 and a second common vector 1251, 1252 (labeled as c12 and c22). The output signal 1260 may be based on a summation of those scaled, filtered outputs.

Referring to FIG. 13, one or more operations illustrated by the example diagram 1300 may be used for generation of the output signal, such as in operation 1130 and/or other operations. It should be noted that two tables are shown and common vectors of length two are shown in FIG. 13 for ease of illustration, but embodiments are not limited to the usage of two tables or to common weight vectors of length two. Any suitable number may be used. In addition, embodiments are not limited to consecutive integer powers and are also not limited to integer powers.

Various powers (exponents) of the input signal 1305 may be used (as indicated by 1321, 1322) to generate inner products similar to those shown in the diagram of FIG. 12. Those inner products may be used to scale filter outputs of the cascade of filters 1331, 1332. The output signal 1360 may be based on a summation of those scaled, filtered outputs.

Non-limiting examples of formulas that may be used in accordance with some embodiments (including but not limited to those of method 1100) are presented below. In some embodiments, these formulas and/or similar formulas may be used as part of one or more operations described herein, but it is understood that embodiments are not limited to usage of these or other formulas. In these formulas, c is the common weight vector, B is a correlation matrix, a is a projection vector, xa and ya may be time aligned signals shown in FIG. 7, and the $\eta_n$ are the distortion compensation functions.

In some embodiments, operations described as part of the method 1100 may be further described using the formulas below, although the scope of embodiments is not limited in this respect.

In some embodiments, the steady-state distortion compensation functions may be based on steady-state distortion compensation tables, in which case an output signal may be described in the formula below. An output sample at time kT; in which k is a discrete time index and T is a sampling period may be described as follows:

$$DPD_{out}(kT) = \sum_{n=1}^{N} c_{n1} \eta_n(f(DPD_{in}(kT)))(h_1(kT)^* DPD_{in}(kT)) +$$

$$\sum_{n=1}^{N} c_{n2} \eta_n(f(DPD_{in}(kT)))(h_1(kT)^* h_2(kT)^* DPD_{in}(kT)) + \ldots$$

The $c_n$ may be one or more common weight vectors that may be used. In this case, the set of powers is between 2 and a number P, which may be any suitable number.

In some embodiments, the steady-state distortion compensation functions may include powers of an amplitude of an input signal, in which case an output signal may be described in the formula below, in some cases. An output sample at time kT, in which k is a discrete time index and T is a sampling period may be described as follows $$DPD_{out}(kT) = \sum_{n=1}^{N} |DPD_{in}(kT)|^{n-1}(h_1(kT)^*DPD_{in}(kT)) +$$

$$\sum_{n=1}^{N} c_{n2}|DPD_{in}(kT)|^{n-1}(h_1(kT)^*h_2(kT)^*DPD_{in}(kT)) + \ldots$$

Non-limiting example formulas that may be used to update one or more common weight vectors are given below.

$$\vec{c} = B^{-1}\vec{a}$$

$$B =$$
$$[\eta_1(y_a)(h_1(kT)^*y_a) \ldots \eta_n(y_a)(h_1(kT)^* \ldots h_{in}(kT)^*y_a)]' * [\eta_1(y_a)(h_1(kT)^*$$
$$y_a) \ldots \eta_n(y_a)(h_1(kT)^* \ldots h_{in}(kT)^*y_a)]$$

$$\vec{a} = [\eta_1(y_a)(h_1(kT)^*y_a) \ldots \eta_n(y_a)(h_1(kT)^* \ldots h_{in}(kT)^*y_a)]'x_a$$

$$c_{nm} = \frac{\sum_{1}^{M} \eta_n(y_a)(h_1(kT)^* \ldots h_{in}(kT)^*y_a)'x_a(kT)}{\sum_{1}^{M} \eta_n(y_a)(h_1(kT)^* \ldots h_{in}(kT)^*y_a)'\eta_n(y_a)(h_1(kT)^* \ldots h_{in}(kT)^*y_a)}$$

In some cases, one or more benefits of various embodiments of DPD described herein (including but not limited to DPD implemented in accordance with the method 600) may be realized. As an example, the DPD may be a low complexity, flexible, and/or scalable. As another example, the DPD may not require factory calibration. As another example, the DPD may include a built-in temperature compensation mechanism. As another example, the DPD may include a built-in compensation for antenna load variation. As another example, the DPD may converge faster than traditional DPD techniques.

It should also be pointed out that any suitable kernel functions/tables (including but not limited to the distortion compensation functions/tables, IQ distortion compensation functions/tables, steady-state distortion compensation functions/tables and/or others described herein) may be implemented and/or programmed into tables in the various implementations of DPD described herein. Accordingly, usage of different kernel function the DPD may be implemented to perform in various conditions, such as device conditions, environmental conditions, operating conditions and/or other conditions.

In addition, coefficients (such as the common weight vector(s) described herein) may be adaptively computed to respond to changes in operating conditions (including but not limited to output power, frequency band and/or other) and/or environmental conditions (including but not limited to temperature, antenna load variation and/or other). Accordingly, the DPD may be trained (adapted) based on observations (period or otherwise) of signals, including but not limited to output signals from the PA and/or other component, feedback signals from the PA and/or other component, output/feedback signals from the PA and/or other component that may be down-converted from an RF range to baseband and/or other signals.

In Example 1, an apparatus of a mobile communication device may be adapted for digital pre-distortion (DPD). The apparatus may comprise a storage element. The apparatus may further comprise a processing component operatively coupled to the storage element. The processing component may scale a sequence of input samples to generate a sequence of output samples for input to a power amplifier (PA). The processing component may generate per-sample distortion compensation vectors based on vector outputs of predetermined distortion compensation functions. The processing component may generate per-sample scale factors to scale the sequence of input samples. The per-sample scale factors may be based on per-sample inner products between a common weight vector and the per-sample distortion compensation vectors. The per-sample scale factors may compensate for distortion of the PA. The processing component may update the common weight vector based on a distortion error sequence between the sequence of output samples and a sequence of feedback samples generated from an output of the PA.

In Example 2, the subject matter of Example 1, wherein the processing component may update the common weight vector to scale a subsequent sequence of input samples.

In Example 3, the subject matter of one or any combination of Examples 1-2, wherein the processing component may update the common weight vector in accordance with a minimization of an expected mean-squared value of the distortion error sequence.

In Example 4, the subject matter of one or any combination of Examples 1-3, wherein the processing component may update the common weight vector in accordance with a correlation matrix of the feedback samples that is based at least partly on cross-correlations between the distortion compensation functions. The processing component may pre-determine the distortion compensation functions as orthogonal functions for which the correlation matrix of the feedback samples is a diagonal matrix.

In Example 5, the subject matter of one or any combination of Examples 1-4, wherein the distortion compensation functions may include one or more orthogonal Zernike functions.

In Example 6, the subject matter of one or any combination of Examples 1-5, wherein the distortion compensation functions may be based on predetermined distortion compensation tables. The processing component may generate the vector outputs based on a predetermined mapping between amplitude ranges of the input samples and intra-table pointers to values within the distortion compensation tables.

In Example 7, the subject matter of one or any combination of Examples 1-6, wherein the sequences of input samples and output samples may be in a baseband frequency range. The processing component may generate the sequence of output samples for up-conversion to a radio frequency (RF) range for input to the PA. The sequence of feedback samples may be based on a down-conversion of a PA output signal in the RF range to the baseband frequency range.

In Example 8, the subject matter of one or any combination of Examples 1-7, wherein the per-sample scale factors may be first per-sample scale factors, and the per-sample distortion compensation vector may be first distortion compensation vectors. The processing component may generate second per-sample scale factors based on per-sample inner products between the common weight vector and second per-sample distortion compensation vectors. The second per-sample distortion compensation vectors may be based on outputs of the distortion compensation functions when the feedback samples are used as input. The processing component may scale the sequence of feedback samples by the second per-sample scale factors. The distortion error sequence may be based on a difference sequence between the sequence of output samples and the scaled sequence of feedback samples.

In Example 9, the subject matter of one or any combination of Examples 1-8, wherein the processing component may determine a time alignment between the sequence of output samples and the sequence of feedback samples to generate the distortion error sequence. The time alignment may be at least partly based on a cross-correlation between the sequence of output samples and the sequence of feedback samples.

In Example 10, the subject matter of one or any combination of Examples 1-9, the processing component may determine, for a candidate group of distortion compensation functions, cross-correlation metrics based at least partly on one or more feedback sequences from the PA when one or more test sequences of output samples are used as input to the PA. The processing component may select, from the candidate group and based at least partly on the determined cross-correlation metrics, the distortion compensation functions to be used to scale the sequence of input samples.

In Example 11, the subject matter of one or any combination of Examples 1-10, wherein the processing component may select the distortion compensation functions from a candidate group of distortion compensation functions based at least partly on an expected antenna loading of the wireless device or an expected operating temperature of the wireless device.

In Example 12, a method of digital pre-distortion may comprise pre-distorting an input signal to generate an output signal to compensate for an expected distortion. The pre-distorting may comprise, for at least one sample of the input signal: determining an intra-table pointer for the input signal sample based on a predetermined mapping between amplitude ranges of the input signal and a candidate range of intra-table pointers; determining a compensation vector based on output values of predetermined compensation tables indexed within the compensation tables by the determined intra-table pointer; and generating a corresponding sample of the output signal based on a product of the input signal sample and an inner product between the compensation vector and an adaptable weight vector.

In Example 13, the subject matter of Example 12, wherein the method may further comprise pre-distorting at least a first sequence of input signal samples in accordance with a first value of the adaptable weight vector to generate a first sequence of output signal samples. The method may further comprise receiving a sequence of post-distortion samples based on a distorted version of the first sequence of output signal samples. The method may further comprise updating the adaptable weight vector to a second value based at least partly on a distortion error sequence between the first sequence of output signal samples and the sequence of post-distortion samples. The method may further comprise pre-distorting a second sequence of input signal samples in accordance with the second value of the adaptable weight vector to generate a second sequence of output signal samples. The second sequence of input signal samples may be subsequent to the first sequence of input signal samples.

In Example 14, an apparatus of a mobile communication device may be adapted for digital pre-distortion (DPD). The apparatus may comprise a storage element. The apparatus may further comprise a processing component operatively coupled to the storage element. The processing component may filter an input signal in accordance with a predetermined in-phase/quadrature (IQ) imbalance of a power amplifier (PA) input path. The processing component may scale the input signal to compensate for distortion of the PA based on a summation of integer powers of an envelope of the input signal weighted by an adaptable weight vector. The processing component may generate an output signal based on a summation of the filtered input signal and the scaled input signal. The processing component may update the adaptable weight vector based on a distortion error signal between the output signal and a feedback signal generated from an output of the PA.

In Example 15, the subject matter of Example 14, wherein the IQ imbalance of the PA input path may be based on a difference between amplitudes and/or phases of real and imaginary parts of a composite impulse response of the PA input path.

In Example 16, the subject matter of one or any combination of Examples 14-15, wherein the input signal and the output signal may be in a baseband frequency range. The processing component may generate the output signal for up-conversion to a radio frequency (RF) range for input to the PA. The feedback signal may be based on a down-conversion of a PA output signal in the RF range to the baseband frequency range.

In Example 17, the subject matter of one or any combination of Examples 14-16, wherein the processing component may filter the input signal in accordance in accordance with a complex finite impulse response (FIR) filter response. The processing component may filter and scale samples of the input signal to generate corresponding samples of the output signal.

In Example 18, the subject matter of one or any combination of Examples 14-17, wherein the processing component may determine a set of IQ imbalance metrics based at least partly on one or more feedback signals from the PA when one or more test input signals are filtered by a candidate group of IQ imbalance compensation filter responses for input to the PA. The processing component may select, from the candidate group of IQ imbalance compensation filter responses and based at least partly on the determined IQ imbalance metrics, an IQ imbalance compensation filter response. The processing component may filter the input signal in accordance with the selected IQ imbalance compensation filter response.

In Example 19, an apparatus of a mobile communication device may be adapted for digital pre-distortion (DPD). The apparatus may comprise a storage element. The apparatus may further comprise a processing component operatively coupled to the storage element. The processing component may filter a sequence of input samples based on a transient distortion of a power amplifier (PA). The processing component may scale the filtered sequence of input samples by per-sample scale factors to generate a sequence of output samples for input to the PA. The filtered sequence may be scaled to compensate for a steady-state distortion of the PA. The processing component may generate the per-sample scale factors based on per-sample inner products between a common weight vector and per-sample steady-state distortion compensation vectors. The processing component may generate the per-sample steady-state distortion compensation vectors based on outputs of predetermined steady-state distortion compensation functions that are based on a steady-state distortion of the PA.

In Example 20, the subject matter of Example 19, wherein the processing component may update the common weight vector based on a distortion error sequence between the sequence of output samples and a sequence of feedback samples generated from an output of the PA.

In Example 21, the subject matter of one or any combination of Examples 19-20, wherein the processing component may update the common weight vector in accordance with a correlation matrix of the feedback samples that is based at least partly on cross-correlations between the steady-state distortion compensation functions. The processing component may pre-determine the steady-state distortion compensation functions as orthogonal functions for which the correlation matrix of the feedback samples is a diagonal matrix.

In Example 22, the subject matter of one or any combination of Examples 19-21, wherein the common weight vector may be a first common weight vector. The processing component may filter the sequence of input samples in accordance with a transient distortion compensation filter response that includes a cascade of at least a first stage followed by a second stage. The processing component may scale a first sequence of filter output samples of the first stage by first per-sample scale factors that are based on first per-sample inner products between the first common weight vector and the per-sample steady-state distortion compensation vectors. The processing component may scale a second sequence of filter output samples of the second stage by second per-sample scale factors that are based on second per-sample inner products between a second common weight vector and the per-sample steady-state distortion compensation vectors. The processing component may generate the sequence of output samples for input to the PA based on a summation of the scaled first sequence of filter output samples and the scaled second sequence of filter output samples.

In Example 23, the subject matter of one or any combination of Examples 19-22, wherein the processing component may update the first and second common weight vectors based on a distortion error sequence between the sequence of output samples and a sequence of feedback samples generated from an output of the PA.

In Example 24, the subject matter of one or any combination of Examples 19-23, wherein the sequence of input samples may be filtered in accordance with a multi-stage filter response. The processing component may, for each stage of the filter response, scale an output sequence of the stage by per-sample scale factors that are based on per-sample inner products between a common weight vector of the stage and per-sample steady-state distortion compensation vectors. The processing component may update the common weight vectors based on a distortion error sequence between the sequence of output samples and a sequence of feedback samples generated from an output of the PA.

In Example 25, the subject matter of one or any combination of Examples 19-24, wherein the steady-state distortion compensation functions may be based on integer powers of amplitudes of the input samples.

In Example 26, the subject matter of one or any combination of Examples 19-25, wherein the steady-state distortion compensation functions may be based on predetermined steady-state distortion compensation tables. The processing component may generate the per-sample steady-state distortion compensation vectors based on a predetermined mapping between ranges of the input samples and intra-table pointers to values within the steady-state distortion compensation tables.

In Example 27, an apparatus of a wireless device may comprise means for pre-distorting an input signal to generate an output signal to compensate for an expected distortion. The means for pre-distorting may comprise, for at least one sample of the input signal: means for determining an intra-table pointer for the input signal sample based on a predetermined mapping between amplitude ranges of the input signal and a candidate range of intra-table pointers; means for determining a compensation vector based on output values of predetermined compensation tables indexed within the compensation tables by the determined intra-table pointer; and means for generating a corresponding sample of the output signal based on a product of the input signal sample and an inner product between the compensation vector and an adaptable weight vector.

In Example 28, the subject matter of Example 27, wherein the apparatus may further comprise means for pre-distorting at least a first sequence of input signal samples in accordance with a first value of the adaptable weight vector to generate a first sequence of output signal samples. The apparatus may further comprise means for receiving a sequence of post-distortion samples based on a distorted version of the first sequence of output signal samples. The apparatus may further comprise means for updating the adaptable weight vector to a second value based at least partly on a distortion error sequence between the first sequence of output signal samples and the sequence of post-distortion samples. The apparatus may further comprise means for pre-distorting a second sequence of input signal samples in accordance with the second value of the adaptable weight vector to generate a second sequence of output signal samples. The second sequence of input signal samples may be subsequent to the first sequence of input signal samples.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a mobile communication device adapted for digital pre-distortion (DPD), the apparatus comprising:
   a storage element; and
   a processing component operatively coupled to the storage element, the processing component to:
   scale a sequence of input samples to generate a sequence of output samples for input to a power amplifier (PA);
   generate per-sample distortion compensation vectors based on vector outputs of predetermined distortion compensation functions;
   generate per-sample scale factors to scale the sequence of input samples, the per-sample scale factors based on per-sample inner products between a common weight

29 vector and the per-sample distortion compensation vectors, the per-sample scale factors to compensate for distortion of the PA; and update the common weight vector based on a distortion error sequence between the sequence of output samples and a sequence of feedback samples generated from an output of the PA.

2. The apparatus according to claim 1, the processing component to update the common weight vector to scale a subsequent sequence of input samples.

3. The apparatus according to claim 1, the processing component to further update the common weight vector in accordance with a minimization of an expected mean-squared value of the distortion error sequence.

4. The apparatus according to claim 1, the processing component to:

update the common weight vector in accordance with a correlation matrix of the feedback samples that is based at least partly on cross-correlations between the distortion compensation functions; and pre-determine the distortion compensation functions as orthogonal functions for which the correlation matrix of the feedback samples is a diagonal matrix.

5. The apparatus according to claim 4, wherein the distortion compensation functions include one or more orthogonal Zernike functions.

6. The apparatus according to claim 1, wherein:

the distortion compensation functions are based on pre-determined distortion compensation tables, and the processing component to further generate the vector outputs based on a predetermined mapping between amplitude ranges of the input samples and intra-table pointers to values within the distortion compensation tables.

7. The apparatus according to claim 1, wherein:

the sequences of input samples and output samples are in a baseband frequency range, the processing component to further generate the sequence of output samples for up-conversion to a radio frequency (RF) range for input to the PA, and the sequence of feedback samples is based on a down-conversion of a PA output signal in the RF range to the baseband frequency range.

8. The apparatus according to claim 7, wherein:

the per-sample scale factors are first per-sample scale factors, and the per-sample distortion compensation vectors are first per-sample distortion compensation vectors, the processing component to further:

generate second per-sample scale factors based on per-sample inner products between the common weight vector and second per-sample distortion compensation vectors, wherein the second per-sample distortion compensation vectors are based on outputs of the distortion compensation functions when the feedback samples are used as input; and scale the sequence of feedback samples by the second per-sample scale factors, and the distortion error sequence is based on a difference sequence between the sequence of output samples and the scaled sequence of feedback samples.

9. The apparatus according to claim 1, wherein:

the processing component to further determine a time alignment between the sequence of output samples and the sequence of feedback samples to generate the distortion error sequence, and

30 the time alignment is at least partly based on a cross-correlation between the sequence of output samples and the sequence of feedback samples.

10. The apparatus according to claim 1, the processing component to further:

determine, for a candidate group of distortion compensation functions, cross-correlation metrics based at least partly on one or more feedback sequences from the PA when one or more test sequences of output samples are used as input to the PA; and select, from the candidate group and based at least partly on the determined cross-correlation metrics, the distortion compensation functions to be used to scale the sequence of input samples.

11. The apparatus according to claim 1, the processing component to further select the distortion compensation functions from a candidate group of distortion compensation functions based at least partly on an expected antenna loading of the wireless device or an expected operating temperature of the wireless device.

12. A method of digital pre-distortion, the method comprising:

pre-distorting an input signal to generate an output signal to compensate for an expected distortion, wherein the pre-distorting comprises, for at least one sample of the input signal:

determining an intra-table pointer for the input signal sample based on a predetermined mapping between amplitude ranges of the input signal and a candidate range of intra-table pointers;

determining a compensation vector based on output values of predetermined compensation tables indexed within the compensation tables by the determined intra-table pointer; and generating a corresponding sample of the output signal based on a product of the input signal sample and an inner product between the compensation vector and an adaptable weight vector.

13. The method according to claim 12, the method further comprising:

pre-distorting at least a first sequence of input signal samples in accordance with a first value of the adaptable weight vector to generate a first sequence of output signal samples;

receiving a sequence of post-distortion samples based on a distorted version of the first sequence of output signal samples;

updating the adaptable weight vector to a second value based at least partly on a distortion error sequence between the first sequence of output signal samples and the sequence of post-distortion samples; and pre-distorting a second sequence of input signal samples in accordance with the second value of the adaptable weight vector to generate a second sequence of output signal samples, wherein the second sequence of input signal samples is subsequent to the first sequence of input signal samples.

14. An apparatus of a mobile communication device adapted for digital pre-distortion (DPD), the apparatus comprising:

a storage element; and a processing component operatively coupled to the storage element, the processing component to:

filter an input signal in accordance with a predetermined in-phase/quadrature (IQ) imbalance of a power amplifier (PA) input path;

scale the input signal to compensate for distortion of the PA based on a summation of integer powers of an envelope of the input signal weighted by an adaptable weight vector;

generate an output signal based on a summation of the filtered input signal and the scaled input signal; and update the adaptable weight vector based on a distortion error signal between the output signal and a feedback signal generated from an output of the PA.

15. The apparatus according to claim 14, wherein the IQ imbalance of the PA input path is based on a difference between amplitudes and/or phases of real and imaginary parts of a composite impulse response of the PA input path.

16. The apparatus according to claim 14, wherein:

the input signal and the output signal are in a baseband frequency range, the processing component to further generate the output signal for up-conversion to a radio frequency (RF) range for input to the PA, and the feedback signal is based on a down-conversion of a PA output signal in the RF range to the baseband frequency range.

17. The apparatus according to claim 14, the processing component to further:

filter the input signal in accordance in accordance with a complex finite impulse response (FIR) filter response; and filter and scale samples of the input signal to generate corresponding samples of the output signal.

18. The apparatus according to claim 14, the processing component to further:

determine a set of IQ imbalance metrics based at least partly on one or more feedback signals from the PA when one or more test input signals are filtered by a candidate group of IQ imbalance compensation filter responses for input to the PA;

select, from the candidate group of IQ imbalance compensation filter responses and based at least partly on the determined IQ imbalance metrics, an IQ imbalance compensation filter response; and filter the input signal in accordance with the selected IQ imbalance compensation filter response.

19. An apparatus of a mobile communication device adapted for digital pre-distortion (DPD), the apparatus comprising:

a storage element; and a processing component operatively coupled to the storage element, the processing component to:

filter a sequence of input samples based on a transient distortion of a power amplifier (PA);

scale the filtered sequence of input samples by per-sample scale factors to generate a sequence of output samples for input to the PA, the filtered sequence scaled to compensate for a steady-state distortion of the PA;

generate the per-sample scale factors based on per-sample inner products between a common weight vector and per-sample steady-state distortion compensation vectors; and generate the per-sample steady-state distortion compensation vectors based on outputs of predetermined steady-state distortion compensation functions that are based on a steady-state distortion of the PA.

20. The apparatus according to claim 19, the processing component to further update the common weight vector based on a distortion error sequence between the sequence of output samples and a sequence of feedback samples generated from an output of the PA.

21. The apparatus according to claim 20, the processing component to further:

update the common weight vector in accordance with a correlation matrix of the feedback samples that is based at least partly on cross-correlations between the steady-state distortion compensation functions; and pre-determine the steady-state distortion compensation functions as orthogonal functions for which the correlation matrix of the feedback samples is a diagonal matrix.

22. The apparatus according to claim 19, wherein:

the common weight vector is a first common weight vector, the processing component to further:

filter the sequence of input samples in accordance with a transient distortion compensation filter response that includes a cascade of at least a first stage followed by a second stage;

scale a first sequence of filter output samples of the first stage by first per-sample scale factors that are based on first per-sample inner products between the first common weight vector and the per-sample steady-state distortion compensation vectors;

scale a second sequence of filter output samples of the second stage by second per-sample scale factors that are based on second per-sample inner products between a second common weight vector and the per-sample steady-state distortion compensation vectors; and generate the sequence of output samples for input to the PA based on a summation of the scaled first sequence of filter output samples and the scaled second sequence of filter output samples.

23. The apparatus according to claim 22, the processing component to further update the first and second common weight vectors based on a distortion error sequence between the sequence of output samples and a sequence of feedback samples generated from an output of the PA.

24. The apparatus according to claim 19, wherein:

the sequence of input samples is filtered in accordance with a multi-stage filter response;

the processing component to further:

for each stage of the filter response, scale an output sequence of the stage by per-sample scale factors that are based on per-sample inner products between a common weight vector of the stage and per-sample steady-state distortion compensation vectors; and update the common weight vectors based on a distortion error sequence between the sequence of output samples and a sequence of feedback samples generated from an output of the PA.

25. The apparatus according to claim 19, wherein the steady-state distortion compensation functions are based on integer powers of amplitudes of the input samples.

26. The apparatus according to claim 19, wherein:

the steady-state distortion compensation functions are based on predetermined steady-state distortion compensation tables, and the processing component to further generate the per-sample steady-state distortion compensation vectors based on a predetermined mapping between ranges of the input samples and intra-table pointers to values within the steady-state distortion compensation tables.

* * * * *